United States Patent [19]
Pouliot

[11] Patent Number: 5,784,249
[45] Date of Patent: Jul. 21, 1998

[54] ELECTRICAL DISTRIBUTION PANEL WITH QUICK CHANGE ELECTRICAL OUTLETS

[76] Inventor: Gary J. Pouliot, 3140 Achilles Dr., Reno, Nev. 89512

[21] Appl. No.: 840,912

[22] Filed: Feb. 25, 1992

[51] Int. Cl.$^6$ ............................................. H02B 1/26
[52] U.S. Cl. .................. 361/622; 174/68.1; 361/624;
361/625; 361/626; 361/628; 361/637; 361/641;
361/643; 361/657
[58] Field of Search ...................... 174/38, 52 R,
174/59, 68.1; 200/51 R, 307; 361/331,
334, 341, 344, 346, 342, 355, 356, 358,
360-361, 390-396, 399, 429, 601-602,
605, 622-626, 628, 641, 637, 643-645,
657; 439/801, 810, 814

[56] References Cited

U.S. PATENT DOCUMENTS

| | | |
|---|---|---|
| 2,103,325 | 12/1937 | Frank et al. . |
| 2,147,023 | 2/1939 | Frank et al. . |
| 2,603,546 | 7/1952 | Lais . |
| 2,632,786 | 3/1953 | Hammerly . |
| 2,855,454 | 10/1958 | Alden ............................. 361/391 |
| 2,916,591 | 12/1959 | Benn . |
| 2,995,670 | 8/1961 | Weiss . |
| 3,341,268 | 9/1967 | Bickford . |
| 3,343,041 | 9/1967 | Pistey et al. . |
| 3,361,938 | 1/1968 | Watson . |
| 3,374,456 | 3/1968 | Evans ............................. 439/814 |
| 3,450,951 | 6/1969 | Boyle . |
| 3,546,364 | 12/1970 | O'Neal ........................... 439/810 |
| 3,585,456 | 6/1971 | Philips, Jr. . |
| 3,691,288 | 9/1972 | Sturdivan . |
| 3,743,891 | 7/1973 | Buxton . |
| 3,753,047 | 8/1973 | Shallbetter . |
| 3,761,780 | 9/1973 | Plummer . |
| 3,762,398 | 10/1973 | Schefke et al. . |
| 3,786,312 | 1/1974 | Roussard . |
| 3,814,833 | 6/1974 | Yamada et al. . |
| 3,818,282 | 6/1974 | Buxton et al. . |
| 3,851,226 | 11/1974 | Chen . |
| 3,895,179 | 7/1975 | Wyatt ............................. 361/657 |
| 4,080,644 | 3/1978 | Reed et al. . |
| 4,180,845 | 12/1979 | Shariff et al. ................... 361/356 |
| 4,223,179 | 9/1980 | Lusk et al. ...................... 439/814 |
| 4,307,436 | 12/1981 | Eckart et al. . |
| 4,318,156 | 3/1982 | Gallagher . |
| 4,425,598 | 1/1984 | Pyle . |
| 4,450,503 | 5/1984 | Warner . |
| 4,546,418 | 10/1985 | Baggio et al. . |
| 4,768,963 | 9/1988 | Barron ........................... 439/814 |
| 4,785,376 | 11/1988 | Dively ............................ 361/622 |

*Primary Examiner*—Gregory D. Thompson

[57] ABSTRACT

An electrical distribution panel with quick change electrical outlets includes an elongated housing frame having multiple sides, a plurality of divider panels secured at different spaced levels in said elongated housing frame to form separated volumetric spaces therein. A plurality of openings are formed in said frame member at each of the volumetric spaces on at least two sides thereof. Main breaker means is provided at one of said different spaced levels, and a main distribution BUS means extends through divider panels and has means for connecting wires thereto through said openings which is accessible through the openings by an external bladed tool from said at lest two sides. A plurality of interchangeable receptacle mounting modules, each mounting module being adapted to be mounted within one of the openings, respectively, and connected by wires to the main BUS means by said bladed tool externally of said housing. Plates for covering the remaining of said openings. The main BUS includes conductor means having bores for receiving said connecting wires, respectively, and threaded bore means at an angle to said first bore means having threaded engagement with a threaded screw, and in which there are a plurality of said first and second bore means distributed at alternately different angles.

14 Claims, 26 Drawing Sheets

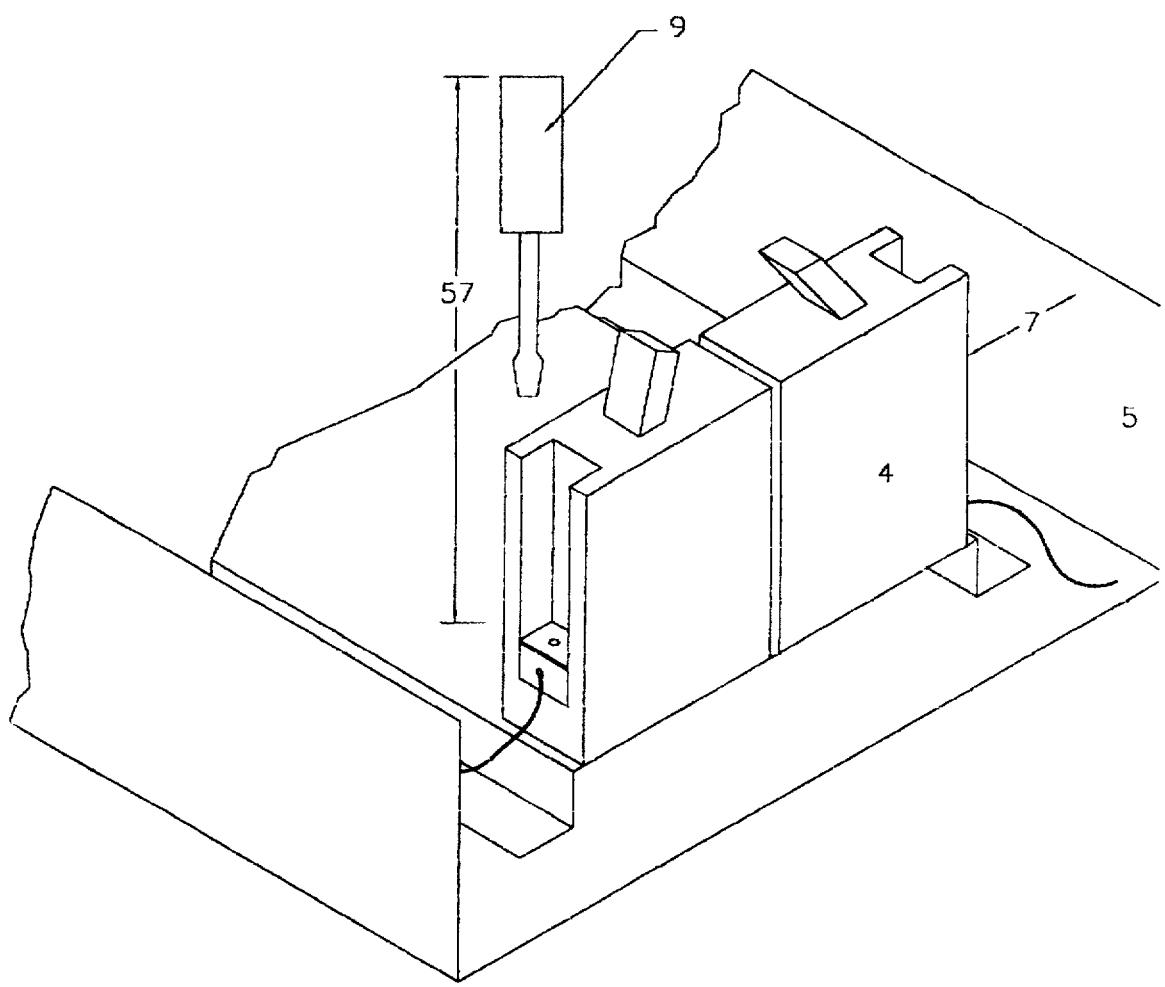
FIG. 5-A

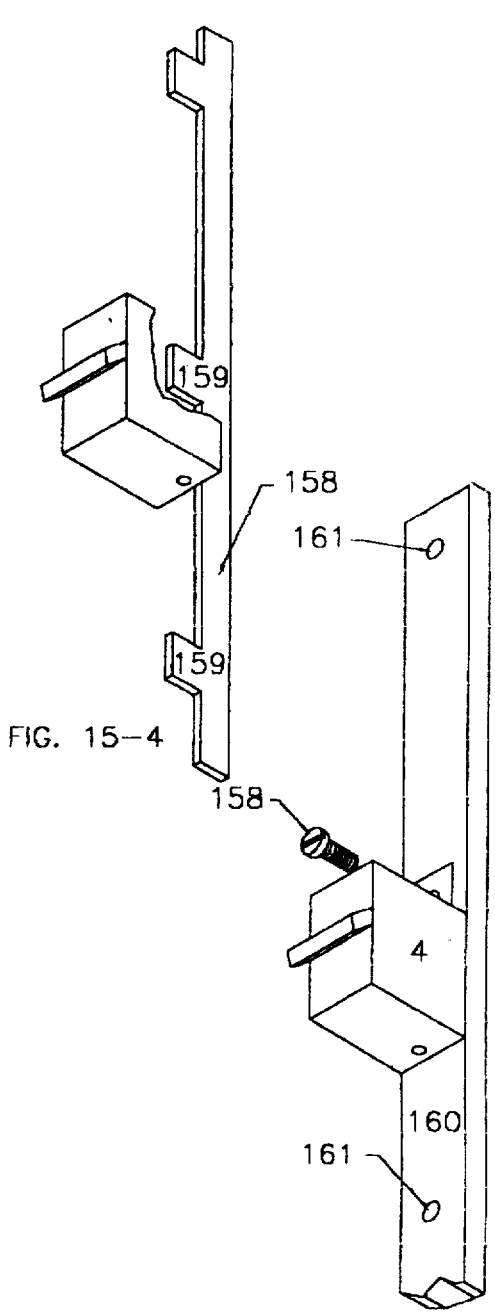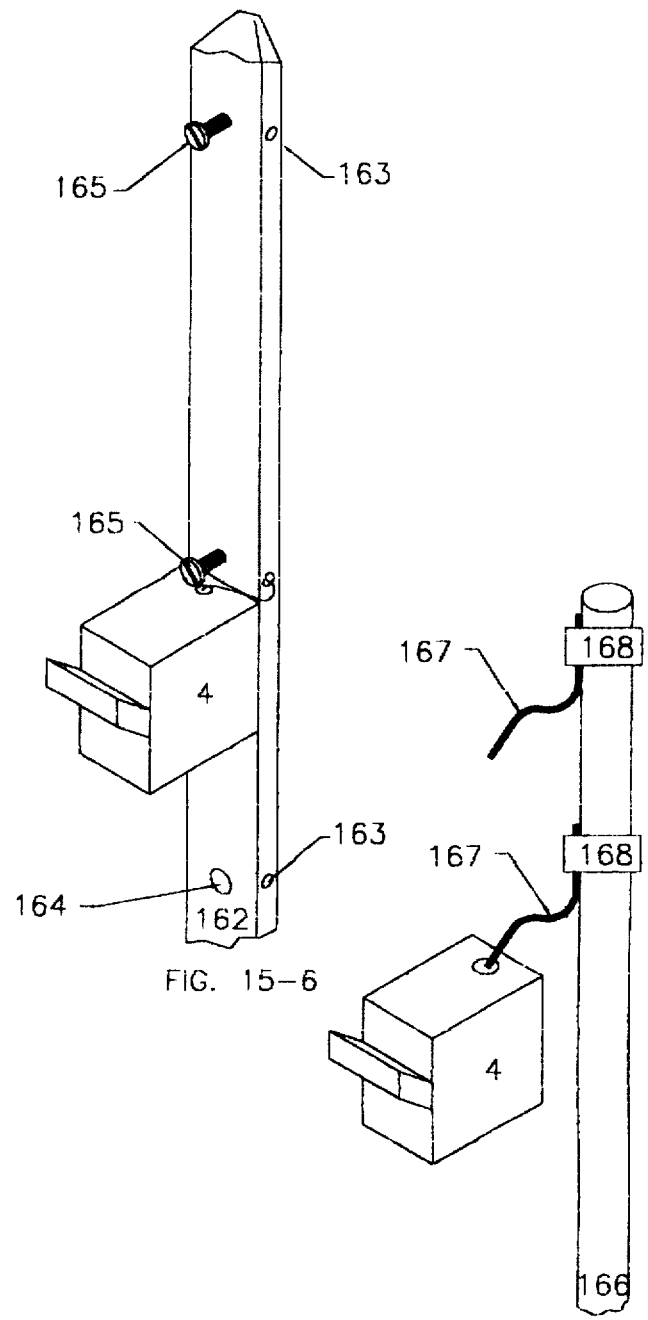
FIG. 15-4
FIG. 15-5
FIG. 15-6
FIG. 15-7

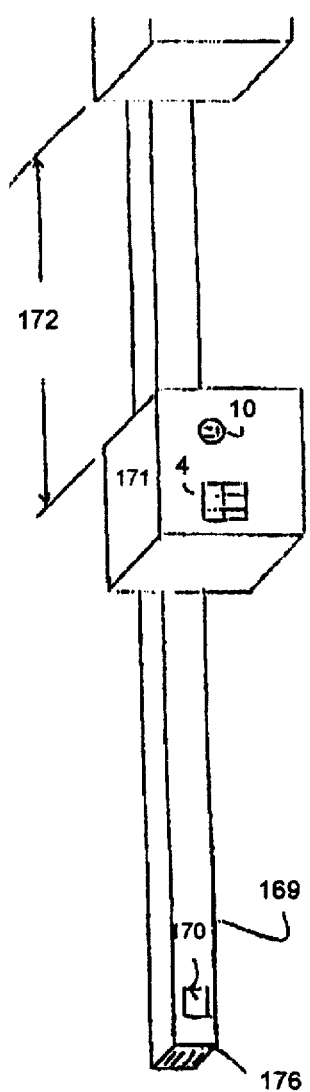
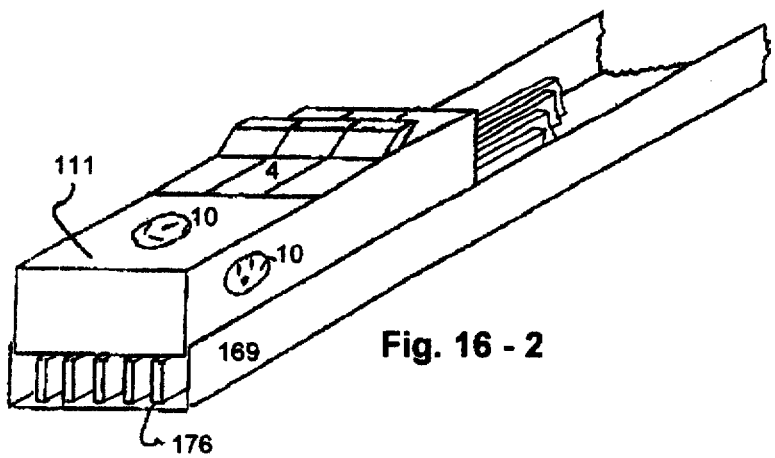
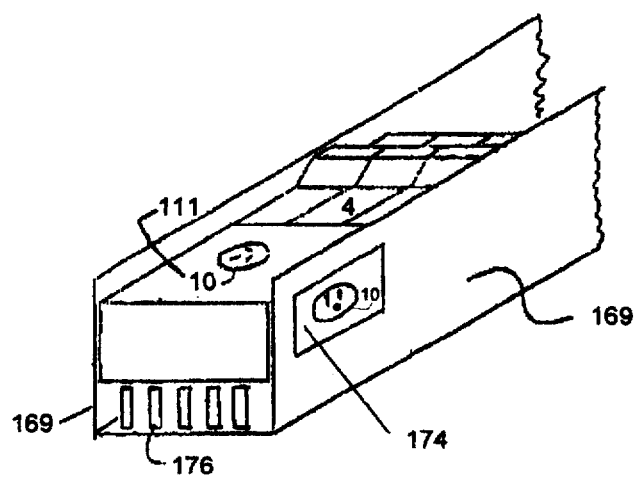
Fig. 16 - 2
Fig. 16 - 3
Fig. 16 - 1
Prior Art

ELECTRICAL DISTRIBUTION PANEL WITH QUICK CHANGE ELECTRICAL OUTLETS

BACKGROUND AND BRIEF DESCRIPTION OF THE INVENTION

This invention relates to electrical panel boards combined with quick change electrical receptacles and, in particular, to a novel and improved system whereby said panel board may be of a greatly reduced size only slightly larger than its branch circuit protection means, having components more readily and safely changeable than heretofore. The panel system of this invention further being capable of utilizing industry standard receptacles. Said panel board may have additional integrated capabilities in one or more auxiliary sections such as, but not limited to, telecommunications, data, gasses, vacuum, and power of a different voltage or frequency.

The object of this invention is to provide a simple, low cost, flexible, and reusable way to provide permanent or temporary point-of-use electrical power distribution and to overcome the considerable disadvantages of the traditional methods of providing same.

The traditional method of accomplishing such distribution involves a remotely located panel board, which is a part of the building (permanently attached). Said panel board supplies either a raceway or conduit and junction box system. That method is very time consuming to design, install, modify and trouble-shoot. It requires the installer to make a multitude of field connections and decisions with the attendant risk of error. Modification and troubleshooting of raceway systems in particular is nearly always disruptive to large areas. Extensive modifications are so time consuming and costly that it is often more cost effective to abandon or tear out the system and start over.

Such standard systems are, in general, not at all practical or cost effective to reuse. When such systems are installed in a leased building, they generally become the property of the building owner.

The present invention has many purposes, some of which are enumerated below: 1) to provide a compact, modular, quick change electrical distribution panel integrating branch fusing with receptacles, with or without auxiliary services; 2) to provide these features in an overall size that is much smaller than is normal, being little larger than the branch circuit protection; 3) to have said panel be completely and readily reusable with only a small percentage of its installed value becoming a part of the building it's installed in; 4) to reduce the total labor content of the electrical system and shift a portion of that labor from the field to the factory with attendant efficiency, quality and reliability improvements; 5) to save a significant percentage of the first cost of the system, and to yield further savings in cost and natural resources by being readily reusable; 6) to save large amounts of design and construction time; and to reduce time loss and disruption associated with changes and trouble-shooting.

Some areas where the invention may be used to advantage are: computer, hospital operating, and clean rooms; manufacturing and assembly areas; laboratory and CAD facilities; and machining cells. It will be apparent to those skilled in the art that numerous other applications are possible. It is readily suited to both retrofit and new construction. In new construction it may be used in lieu of in-slab raceway, allowing thinner and lighter floors and supporting structures, resulting in cost reductions to the building itself and reduced use of natural resources for building floors and structure.

Heretofore electrical distribution in buildings was accomplished via separate panel boards connected to either raceway or conduit and junction box systems. The relevant prior art, discussed later herein, was actually not designed for point of use power distribution within buildings; rather as temporary power for boats and recreational vehicles, as power entrance services for mobile homes, or as temporary power for construction sites. Accordingly, the prior art is not well suited to interior point of use branch circuit distribution.

The need to provide such flexibility, modularity, and reusability in permanent branch circuit power distribution was not recognized. With the short product life cycles common in many business today, it is common place to completely remodel entire areas of industrial and commercial buildings with ever increasing frequency. There is also an ever increasing awareness of the need to conserve natural resources, which my unit does by being reusable and by allowing different building practices.

U.S. Pat. No. 2,632,786 by Hammerly, discloses a section of busduct which includes a number of fusing devices and receptacles. In this device all receptacles are restricted to one side. They are covered by one single cover plate which closely fits the receptacles. This limits the type of receptacles to those that fit the punched plate. Receptacle changes of necessity involve disruption of all the receptacles and any loads connected to them. To change the ampacity of the fuses, the feed wires would have to be changed requiring deenergization of the entire unit for safety. This device is intended as a monitoring station for bus duct and uses only one fuse/phase.

U.S. Pat. No. 2,995,670 by Weiss, discloses what is known in the construction trades as a "spider box". It is designed to provide temporary power to construction sites, etc. It is large and though it has receptacles mounted on a plurality of sides, they are mounted through close fitting apertures in the housing sidewalls rather than in separate and removable plates. This limits the type of receptacles that can be mounted once the box is punched (typically at the factory). This design does not lend itself to safely working on one branch circuit or receptacle without deenergizing the rest. The branch breakers are fed via wire rather than via a bus and cannot safely be changed without deenergizing the entire unit. Branch breakers are neither immediately adjacent to nor in obvious geographic spatial association with the receptacles they supply. The overall size of the unit is much larger than in the present invention because required working space is inside the housing.

U.S. Pat. No. 3,341,268 by Bickford, discloses a power entrance service for boat docks and the like. No particular effort has been made to reduce its size. All receptacles are located on one side. All breakers are also on that side. Receptacles are mounted through close fitting holes in the sidewall, which limits field interchangability. Changing individual receptacles without disconnecting power to the others is dangerous. Breakers are wire fed, not bussed. Changing breakers requires deenergizing the entire unit.

U.S. Pat. No. 3,343,041 by Pistey et al., discloses a device designed to provide power entrance service for boats at marinas. It employs a bus system to supply the branch breakers. Branch breakers are not immediately adjacent to or in obvious spatial association with the receptacles they serve. Changing one receptacle and breaker without deenergizing the remainder entails significant risk of shock. The unit is larger than necessary because it provides required wiring working space inside the housing rather than outside.

U.S. Pat. No. 3,361,938 discloses a mobile home power entrance service. The receptacles are all mounted on one side, through closely fitted apertures on a single plate, limiting flexibility for field changes. This plate does not appear to be removable further limiting flexibility for changes. The receptacles are all on one side, the same side as the breakers. Changing one receptacle without deenergizing the entire unit would be dangerous. Breakers are wire fed, not bussed. Safe changing of breakers also requires deenergizing the entire unit.

U.S. Pat. No. 3,585,456 by Phillips, discloses a power entrance service for mobile homes with one removable plug on plate which mounts one or more breakers or one or more receptacles. This allows rapid and safe changing of the breakers and receptacles without deenergizing their feed. However, they must all be removed as a unit which would disrupt power to all receptacles and breakers to change any one. This unit mounts the receptacles all on one side, either the same side as the breakers in one embodiment or on another side determined at the time of manufacture. U.S. Pat. No. 3,691,288 by Sturdivan, is essentially the same as 3,585,456 except no second side is cited.

U.S. Pat. Nos.: 3,743,891 by Buxton and 3,818,282 by Buxton et al., disclose a power entrance service for mobile homes. This system employs a plurality of plug-on modules which combine circuit breakers with receptacles in a unit assembly. This unit assembly or module integrates receptacle components directly into the module itself. That is, the receptacle component parts have no separate housing of their own but rely on the module for support, positioning, and electrical insulation. Once factory assembled this module cannot have its receptacle changed in the field to a different type. It can not mount industry standard self contained complete receptacles at all. Individual modules can be changed without disturbing the remainder of the modules. All receptacles are limited to one side, the breaker side, of the device.

U.S. Pat. No. 3,753,047 by Shallbelter, discloses a power entrance service for mobile homes. Receptacles are mounted through close fitting punched holes in a non-removable wall, limiting field modifications. It is not safe to work on receptacles with power on to the unit (hot). All receptacles and breakers are on one side. Breakers are wire fed, not bussed. Changing breakers without deenergizing the entire unit is dangerous. The unit is physically large. Working space is within housing—not outside.

U.S. Pat. No. 3,786,312 by Roussard, discloses a "scatter box" or "spider box" for temporary wiring at construction sites, etc. Branch breakers are wire fed, not bussed, and cannot be safely changed without deenergizing the entire unit. Breakers are not accessible from outside the housing, and are not in obvious spatial association with (or dedicated to) a particular receptacle. Receptacles are mounted through close fitting apertures in a non-removable sidewall limiting flexibility. All receptacles are on one side.

U.S. Pat. No. 3,814,833 by Yamada et al., discloses a raceway system. This system does not keep the size of the housing as small as possible—it is intended to cover significant distances rather than to be compact. This system does not ensure that breakers or receptacles are changeable without disruption to other circuits. In its disclosed embodiment, it locates breakers and their receptacles far from each other. It allows breakers and receptacles only on the same side and only on one side.

U.S. Pat. No. 3,851,226 by Chen, discloses a control box which is intended to provide switchable and possibly fused power to a work bench or the like. There is no bus. Receptacles and any fusing are mounted and changed as a unit, each unit may not be changed without disturbing the other such units in the assembly. Safe handling of one module requires that it and others be deenergized. Receptacles and any fusing are limited to one and the same side.

U.S. Pat. No. 4,080,644 by Reed et al., discloses a mobile home power entrance service. This unit combines circuit breakers and receptacles and mounts them on removable plug-in plates. Breakers and receptacles are restricted to one and the same side only. The plug-in plates do not meet current overlap requirements on vertical edges.

U.S. Pat. No. 4,307,436 by Eckart et al., discloses a marina power entrance service for multiple boats. The circuit breakers are in obvious spatial relationship with the receptacles they feed. Breaker feeds are wired, not bussed. The entire unit must be deenergized to change circuit breakers or receptacles safely. Field wiring is extremely difficult and inaccessible. Receptacles are available on two sides only.

U.S. Pat. No. 4,318,156 by Gallagher, discloses a suitcase-like arrangement for temporary power for theatrical-type uses. Receptacles are not safely changeable without deenergizing the entire unit. Access to receptacle wiring requires disturbing all receptacles. Breakers are not in obvious spatial relationship with the receptacles they feed. Receptacles and breakers mount on one and the same side only.

U.S. Pat. No. 4,425,598 by Warner, discloses a "spider box" for supplying temporary power for construction sites and the like. Changing of wiring from receptacle to breaker is probably not safe without deenergizing the entire unit. Replacement of one receptacle without deenergizing all of unit is difficult.

OTHER PRIOR ART:

Surface mounted raceway systems such as manufactured by Wiremold, Panduit, etc. have provisions for mounting circuit breakers and receptacles on one and the same side. These have no bussing provisions for breaker feed. The entire assembly gets extremely long if many breakers or receptacles are used.

Bus duct systems typically have a tapping system enclosed in a box which contains fuses or breakers and may contain receptacles. These generally mount at fixed intervals several feet apart. Breakers and receptacles are typically on only one side and on the same side. Generally the entire tap must be turned off to make changes but the bus duct and other taps may be left on during this process.

Power poles, basically one or more pieces of surface mounted raceway mounted vertically, generally don't have breakers. If they do have breakers, usually one breaker or set of breakers feeds the entire pole and functions as a m"main" without branches, with no provision for separate branch fusing of each receptacle. Receptacles are not spatially related to breakers.

The following U.S. patents further reflect the state of the art: 2,103,325 to Frank et al., 2,147,023 to Frank et al., 2,916,591 to Benn, 4,425,598 to Pyle, 3,450,951 to Pyle, 3,761,780 to Plummer, 3,762,398 and 4,546,418 to Shefke et al.

PRIOR ART DISADVANTAGES: SUMMARY

The prior art units all have one or more of the following disadvantages:

1) Receptacles are mounted through an unremovable wall of the enclosure with close fitting apertures for receptacle faces. This limits the flexibility to change receptacle types (effectively determined at the factory) and also limits access to receptacles and their wiring, generally requiring the entire unit be deenergized to change receptacles;

2) All receptacles are mounted through a single removable plate with close fitting apertures for receptacle, faces. This results generally in disturbing all loads and deenergizing all receptacles to change one;
3) Receptacles are mounted only on the same side of the panel as breakers. This limits flexibility.
4) Receptacles are mounted only on one side. This limits flexibility;
5) Receptacles are not directly adjacent to, or not in other obvious spatial relationship with, their feed breakers. This requires a circuit diagram or trouble-shooting time and possible deenergization of the unit to be certain which breaker feeds which receptacle;
6) Branch breakers are not supplied by a bus or the breaker bus is not of push on design. This requires the entire unit to be disconnected to change breakers;
7) None have safety dividers/separator plates or compartmentalized wiring spaces to minimize shock hazard and allow other receptacles to remain energized while changing a receptacle or beaker;
8) Many have very awkward access to receptacle or breaker wiring resulting in inconvenience, lost time, and the necessity to deenergize entire unit to make changes;
9) Some units are not of dead front design;
10) Some units require and can utilize only non-industry standard receptacles;
11) Some units don't meet required safety overlap standards on receptacle or breaker mounting or access plates;
12) Many are unnecessarily large. This may be because wire bending/working space is inside rather than outside the enclosure or because incremental addition of components increases a dimension other than the largest one.
13) They are generally adaptable to one specific mounting orientation and feed direction (i.e., vertical with top feed).

It is an object of my invention to provide a point-of-use power distribution system which takes advantage of the savings inherent in placing the circuit protection breaker panel at the same location as the group of loads it feeds, rather than remote therefrom, thereby taking advantage of the obvious savings inherent in running only one set of feed wires instead of a multiplicity of branch circuit wires to each receptacle/load from a remote building panel.

Another object of the invention is to provide a simple, novel, flexible way to do same for either permanent or temporary applications. A further object of the invention is to provide for interchangeable mounting and over current protection for a large variety of types and amperages of industry standard and custom receptacles. A further object of the invention is to overcome the disadvantages listed previously of the prior art, particularly those affecting the convenience, speed, and safety of making field modifications to the receptacles and their fusing and to the ease of installation and reuse of the device as a whole.

It is a further object of my invention to provide a safe device that meets all overlap standards, that has dead front construction, that has provision for a split dead front that is separately openable (so not all live parts need be exposed to work on some), that has hinged dead fronts for convenience and rapid access, and that has separator plates/safety dividers or other shielding between sections to reduce the likelihood of contacting adjacent parts when making component changes.

It is a further object to provide a highly flexible field and factory configurable system that lends itself to rapid and safe changes, that has convenient access to all wiring and components, has circuitry exposed for full visibility and accessibility, and has clear spatial associations between branch breakers and their receptacles. It is a further object that branch breakers (and receptacles) be safely and quickly changeable without deenergizing the entire unit and without disturbing connections to the majority of the equipment connected to them. It is a further object that branch breakers may be fed by a bus system, preferably of push-on design, having incoming power connected to feed lugs only, main fusing, main breaker, or disconnect device.

It is a further object that receptacles mount in small groups directly to interchangeable and removable modules, which are mountable in a plurality of positions on a plurality of sides. It is a further object to allow receptacle mounting on a side other than the breaker side. It is a further object that said receptacle mounting modules have fastening provisions such as key holes or captive screws to allow rapid mounting and removal.

Still a further object of this invention is to provide a branch circuit protection panel with a plurality of locations on one or more sides capable of interchangeably mounting various amperage one and two gang electrical receptacles with various boss diameters without permanently modifying the enclosure (no cutting). It is a further object that this panel also have interchangeable branch circuit protection means. It is a further object that said circuit protection means and said receptacles be capable of being rapidly and safely changed without deenergizing the panel as a whole and preferably without deenergizing receptacles or circuit protection means other than the ones being changed, and without unplugging loads from other receptacles. It is a further object to make the enclosure for this system as small as practical and substantially smaller than has been done previously. It is a further object to have obvious associations between the circuit protection means and the receptacles they serve without requiring recourse to a wiring diagram and to have a minimum of interconnecting wiring and have that as short as possible and 100 percent accessible. It is a further object to provide for recessing or covering circuit breaker handles to prevent accidental switching activity.

It is a further object that the panel be readily mountable in multiple orientations and positions with little if any change to the basic unit required. By way of example: vertical, vertical inverted, horizontal; on floor, wall, column, ceiling, under or on work benches, on a pedestal; with readily changeable incoming feed direction; and with provision for extension housing for feeding from overhead like a power pole.

It is a further object that the panel be inexpensive to manufacture, easily and fully reusable, and have modular components and assemblies.

The invention's overall size is significantly smaller than the prior art. In particular, it is made smaller by providing working space outside the housing in at least two dimensions instead of inside and by offsetting or relocating components to make more effective use of the available interior space.

According to the invention, the components are so arranged that the housing need increase only in its largest dimension to incrementally add more and more branch circuit capability. It includes provision for a cover, which may be hinged, to conceal and protect circuit breaker handles from bumping. The invention may include a section for auxiliary services such as telecommunications, gasses, other voltages or frequencies, etc., which may be integrated into the same housing as the main power system or located in a separately installed section. According to a further feature of the invention the auxiliary section(s) and power section may be fed via two or more separate conduits. The two or more conduits may be arranged one inside the other with one or more conduits passing completely through one or more auxiliary sections without terminating therein.

In some respects the invention may be thought of as an improvement to the following conventional devices: circuit breaker panels/power outlets; raceways/power poles; or bus ducts. It may be thought of as a circuit breaker panel or power outlet with more capabilities and a substantially smaller size. It may be thought of as a raceway or power pole having breakers and receptacles mountable in a more convenient and compact manner with radically less length required for a given number of said devices. It may be thought of as a bus duct system with very compact taps embodying circuit protection means and receptacles. Said taps being located immediately adjacent to each other or substantially so.

DESCRIPTION OF THE DRAWINGS

The above and other objects, advantages and features of the invention will become more apparent when considered with the following specification and accompanying drawings wherein:

FIG. 3-1 shows a perspective view of a preferred embodiment of the hinge for the door and dead front(s), FIGS. 3-2 through 3-5 show views looking down on the hinge illustrating how the various leafs cooperate with the door and the dead fronts.

FIG. 3-2 shows the leaf positions with the door and dead front closed,

FIG. 3-3 shows the leaf positions with the door open 180 degrees and the dead front closed, FIG. 3-4 shows the leaf positions with the door open 180 degrees and the dead front open 90 degrees, FIG. 3-5 shows the leaf positions with the door and dead front both open 180 degrees FIG. 4 shows in plan view a preferred example of an interchangeable receptacle mounting module constructed in the form of a single plate.

FIG. 5a shows in perspective the location of breaker output working space in a typical circuit breaker panel of conventional prior art construction, FIG. 7-1 shows in perspective a preferred arrangement for an extension housing configured to supply an auxiliary section and a power section, according to my invention.

FIG. 7-2 shows in perspective an alternate preferred embodiment of an extension housing configured to supply two auxiliary sections and a branch circuit breaker system, FIG. 7-3 shows a number of possible cross-sections for extension housings shown in FIGS. 7-1 and 7-2.

FIG. 8-1 illustrates in perspective a prior art bus design with its wire and screw orientation scheme, FIG. 8-2 shows in perspective a preferred alternate embodiment for the neutral and ground busses with fastener access for binding wires from two directions according to the invention, FIG. 8-3 shows still another neutral or ground bus embodiment with access from two directions.

FIG. 8-4 shows in perspective a prior art buss system with slide on branch wiring shoes or folded lugs (but normally assembled with screws in one direction), FIG. 9-1 shows a prior art electrical schematic for a conventional circuit breaker panel which may be employed in a preferred embodiment of the invention.

FIG. 9-2a shows in perspective the physical arrangement of the incoming power auxiliary lug block, jumpers, main breaker, panel interior, and circuit breakers of a preferred embodiment of the invention, FIG. 9-2S shows the electrical schematic for the arrangement in FIG. 9-2a, FIG. 9-3a shows in perspective the physical arrangement of the incoming power, main breaker, main breaker interior, jumpers, branch circuit breaker interior and branch breakers of yet another preferred embodiment, FIG. 9-3S shows the electrical schematic of the embodiment of FIG. 9-3a, FIG. 10-1 shows in perspective, in simplified form a portion of a preferred embodiment employing receptacles mounted on interchangeable plate-type modules and employing a single row or stack of circuit breakers, FIG. 10-2 shows in perspective another preferred embodiment similar to FIG. 10-1 except that some of the modules are composed of plates in two intersecting planes, FIG. 10-3 shows in perspective another preferred embodiment similar to that of FIG. 10-1 that uses modules with plates in three planes, FIG. 11-1 shows in perspective a prior art system mounting both circuit breakers and receptacles to a platelike module that attaches to a circuit breaker panel as a unit, modified to provide code required overlap on all edges of the plate-like modules, FIG. 11-2 illustrates in perspective a preferred module according to the invention made up of three intersecting plates.

FIG. 11-3 shows in perspective a preferred module embodiment that is similar to the module of FIG. 11-1, only bent 90 degrees just beyond the edge of the circuit breaker, this same bending strategy may be applied to the other modules also, FIG. 11-4 shows in perspective another preferred embodiment of the module of FIG. 11-3 with the receptacle located to the side of, rather than the end of, the breakers, FIG. 11-5 shows in perspective another preferred embodiment of FIG. 11-1 which variation places the receptacle to the side of the circuit breakers, FIG. 13-1 shows in perspective another preferred embodiment of a box-type module which mounts both circuit breakers and receptacles, FIG. 13-2 shows in perspective another preferred embodiment of a box type a module similar to that of FIG. 13-1 except the box has been bent: so as not to extend substantially beyond the circuit breakers output end, FIG. 13-3 shows in perspective yet another preferred embodiment of a box type module similar to that of FIG. 13-1 except a receptacle is located to the side of the circuit breakers, FIG. 13-4 shows in perspective a preferred embodiment details which allow the box type modules of FIG. 13-1 through 13-3 to mount different circuit breakers and receptacles interchangeably, FIG. 14-1 shows in perspective a preferred embodiment similar to that of FIG. 1 and 10-1 except for the receptacle mounting scheme.

FIG. 14-2 shows in perspective one side of an alternate preferred embodiment of FIG. 14-1 having receptacles which mount directly to a plurality of small openings, FIG. 15-1 shows in perspective a prior art U-shaped raceway-type housing employing receptacles and wire fed circuit breakers, FIG. 15-2 shows in perspective two U-shaped raceways fastened back-to-back, FIG. 15-3 shows in perspective a preferred embodiment of a U-shaped raceway-type housing combined with combination circuit breaker and receptacle modules, FIG. 15-4 shows in perspective a preferred prior art branch breaker feed embodiment employing a single bus with stabs for feeding circuit breakers that is suitable for use in long thin raceway or bus duct-type enclosures. This bus though illustrated singly would normally be employed in multiples, FIG. 15-5 shows in perspective another preferred prior art branch breaker feed embodiment employing a single bus as in FIG. 15-4 only with provision for the bolt on feed of circuit breakers, FIG. 15-6 shows in perspective another preferred prior art branch breaker feed embodiment employing a single buss as in FIG. 15-4 only of wire on design with intersecting wire and binding screw holes, FIG. 15-7 shows in perspective yet another preferred prior art branch breaker feed embodiment employing a single bus as in FIG. 15-5 only with the bus being constructed of wire, FIG. 16-1 shows in perspective a prior art bus duct system, FIG. 16-2 shows in perspective a preferred embodiment of a bus duct or raceway-type system with a bus system and combination circuit breaker and receptacle modules, FIG. 16-3 shows in perspective a preferred embodiment of a raceway-type system like FIG. 16-2 except with the raceway/bus duct sides extending to enclose the modules on their sides.

DETAILED DESCRIPTION OF THE INVENTION:

Summarizing the above discussion my invention is the use of interchangeable modules to mount receptacles and or circuit breakers. The modules described herein vary in both structure and function. The structure of the modules is of two general types. One type is composed of one or more plates, or plate like segments, and does not totally surround any space. The other is of box like structure and does enclose a space completely within its boundaries (though there may be large openings in one or more of its sides). They vary further in terms of function. Some mount receptacles only. Some mount both receptacles and circuit breakers. Some mount receptacles only in one plane. Some mount them in more than one plane. Some mount them in the plane of the circuit breaker that feeds them. Some mount them in a plane other than the circuit breaker that feeds them. The disclosure that follows will describe these modules and the variations in the panels that utilize them in more detail.

Figure 1:
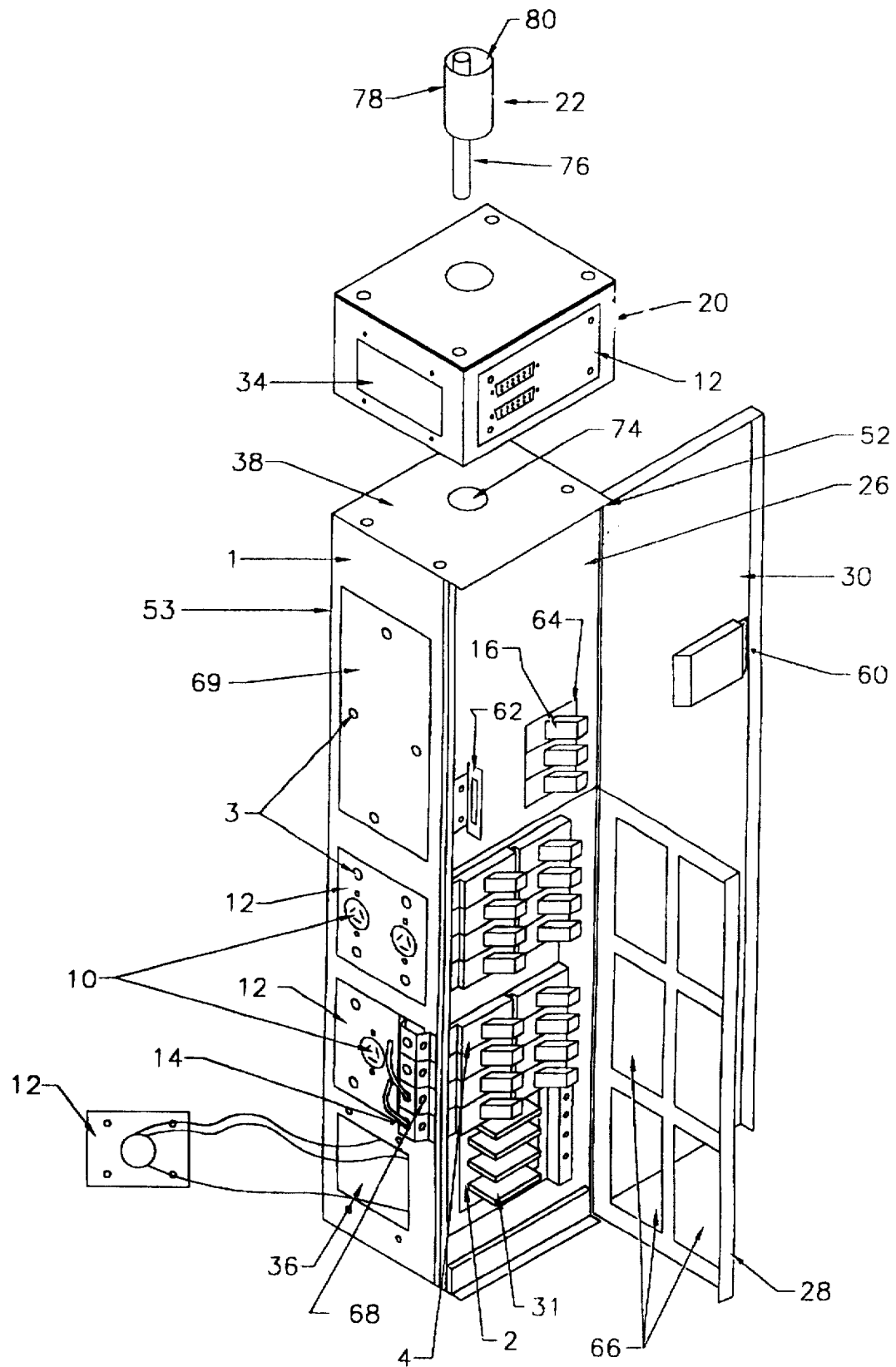
FIG. 1 shows a perspective view of a preferred embodiment of the invention, partially disassembled and cut away.
Figure 2:
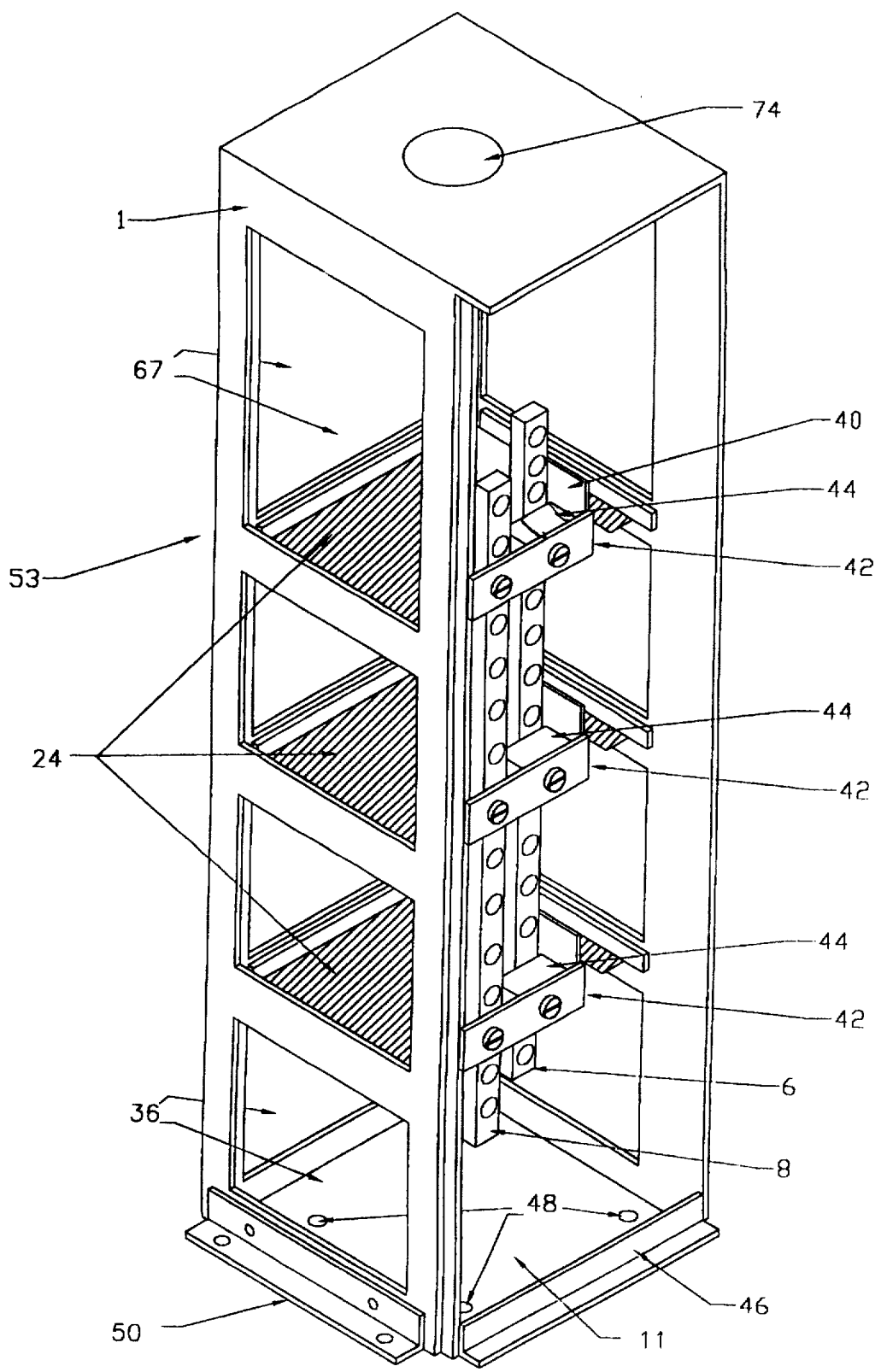
FIG. 2 shows a perspective view of the embodiment in FIG. 1 further dismantled so as to show the separator plates/safety dividers and the neutral and ground busses in more detail.

The preferred embodiment shown in FIGS. 1 and 2 includes a circuit breaker panel interior 2, which may be of any design. (Several companies manufacture such assemblies among them Westinghouse, General Electric, Cutler Hammer, and Square D). It also includes branch circuit breakers 4, neutral bus 6, ground bus 8, electrical outlets 10 mounted on quick change interchangeable modules 12 (here shown in the form of a plate) located on one or more sides, and interconnecting wiring 14.

It may also include one or more of the following: (See also FIGS. 9-1 to 9-35) main lugs 17, main disconnect means, 16 (which may be provided by breakers or other means that are well known in the art), and remote incoming power lugs 18.

These components are incorporated in and/or supported by the main housing 53 which also serves to enclose energized parts. The housing may also include one or more auxiliary sections 20 which may be either integral with the main housing or of separate construction. An extension housing 22 (also see FIG. 7-1 to 7-3) or ordinary conduit may be joined to the housing. This will allow the instalation of incoming wiring from overhead (like a power pole) if desired.

The main housing as illustrated includes a generally "U" shaped section 1, bottom plate 11, separator plates/safety dividers 24, upper dead front 26, lower dead front 28, door 30, quick change plate type electrical device (outlet/receptacle) mounting modules 12, and power entrance cover plates 69. The optional auxiliary section 20 is also fitted with quick change modules 12; which may support electrical, telecommunications, signal, video, etc. receptacles; gas, vacuum, or fluid connectors and valves; or other utilities.

The "U" shaped main housing 1 is shown fabricated from a single piece of material. It may of course be fabricated from multiple pieces and be made of plastic, metal or other suitable materials. When fitted with a door 30 across the open side, it forms a rectangular cross-section. However, this cross-section could have any number of sides or be circular, oval or free form in shape. Openings 67 (on a plurality of sides) provide field access to connect incoming power. Openings 34 on a plurality of sides are adapted to receive and be covered by the quick change auxiliary device mounting plates 12. Openings 36 on a plurality of sides are adapted to receive quick change device plates mounting power receptacles. Fasteners 3 secure removable plates 12 and 69 to the main housing. The top of the main housing is closed by top plate 38.

Separator plates/safety dividers 24 divide the housing into separate wiring compartments or volumetric spaces providing a safety barrier between live components in adjacent sections thereby enhancing safety while making changes to receptacles, breakers, or wiring for one module without deenergizing the rest. The separator plates may be attached to the housing in any convenient manner. As shown in FIG. 2, opening 40 in the separator plates provides clearance to allow neutral 6 and ground 8 busses to pass through. Unique construction features for the preferred embodiments for these busses are discussed later herein (see FIGS. 8-1 to 8-3). Flanges 42 provide support for the neutral and ground busses.

The neutral bus 6 is secured by fasteners, to flange 42 and is insulated from the housing by suitable insulators 44 if it would otherwise come into contact with conductive parts. The ground bus 8 is secured to the flange by suitable fasteners and may be insulated like the neutral to provide isolated ground if desired. The neutral and ground busses extend the full length of the receptacle mounting section providing for connection points substantially adjacent to all receptacles or other load connections.

The bottom plate 11 is fastened by suitable means to the "U" shaped section 1. It incorporates a flange 46 which serves as a stop for the lower dead front. Mounting holes 48 are provided for securing the housing to a mounting surface such as a floor or bench. Optional external mounting feet 50 may also be provided for easier mounting. Said feet being attached to the housing by suitable fasteners. It will be obvious to those skilled in the art that many different mounting brackets are possible for securing the housing to walls, columns, work benches, ceilings, bus ducts, etc. The housing may also be mounted on a wheeled base (not illustrated).

Note that by inverting the housing it be comes a bottom fed system. The external mounting feet 50 may be attached on the other end for this purpose.

Figures 1, 3:
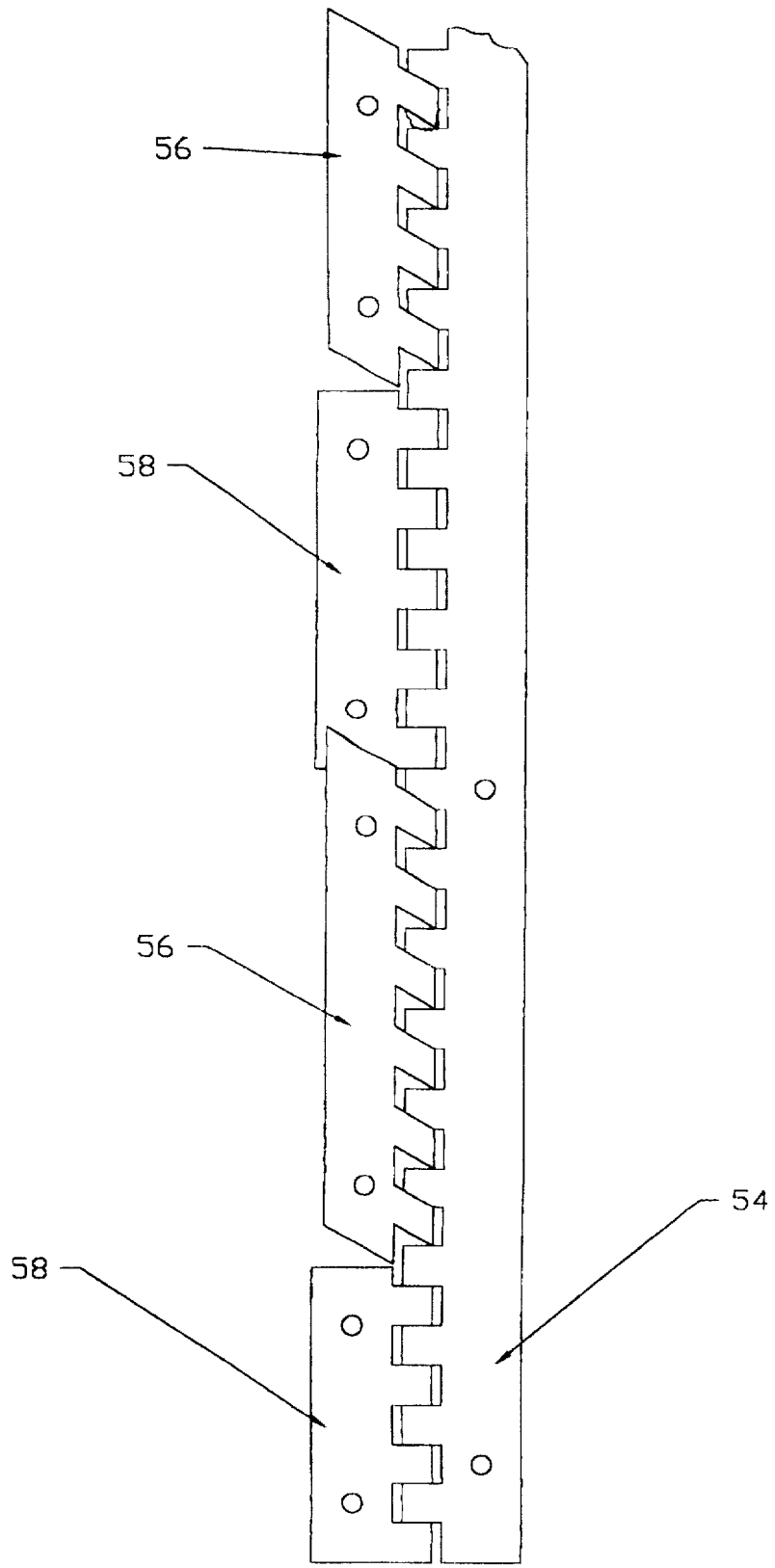
Figures 2, 3:
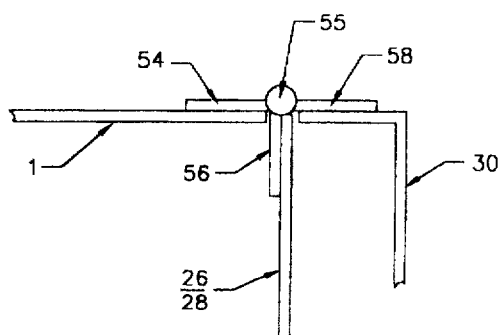

FIG. 3-1 shows a perspective view of a preferred embodiment of the hinge for the door(s) and dead front(s).

Hinge assembly 52 (see also FIGS. 3-1 to 3-5) mounts to the "U" shaped housing and hingeably supports the dead fronts 26 and 28, to allow access to some sections without exposing others; and the door 30. Though a two piece dead front is illustrated, it may be a single piece or multiple pieces as well. The hinge leafs pivot around a common hinge pin 55. Hinge leaf 54 is attached to the housing by suitable means (rivets, welds, bolts, etc.). The other hinge leaf is split into multiple sections, some of which 56 are attached to each dead front(s) and some of which 58 are attached to the door. Obviously the door could also be divided if desired. This arrangement allows the door(s) and dead front(s) to be opened individually or collectively through a wide angle without interference with the housing or each other.

FIGS. 3-2 to 3-5 show top views of the hinge illustrating how the various leafs are positioned relative to each other when the door and dead front are in various positions. The reference numbers from FIG. 3-1 apply to these figures as well. Note that only a small portion of the following components is shown in these figures: door 30, upper dead front 26, lower dead front 28, and "U" shaped housing 1.

FIG. 3-2 shows the position of the leafs with both door and dead front closed.

FIG. 3-3 shows the position of the leafs with the door open 180 degrees and the dead front closed.

Figures 3, 4:
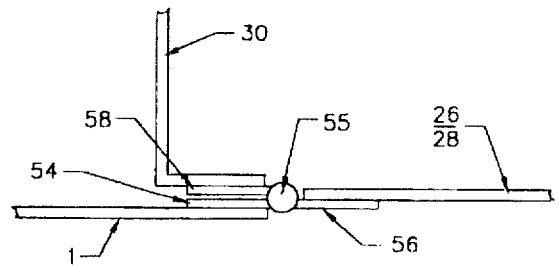
Figure 3:
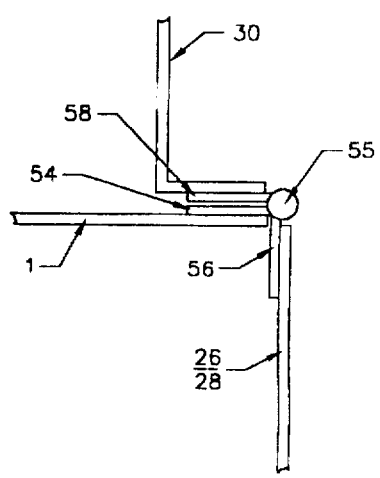

FIG. 3-4 shows the position of the leafs with the door open 180 degrees and the dead front open 90 degrees.

Figures 3, 4, 5:
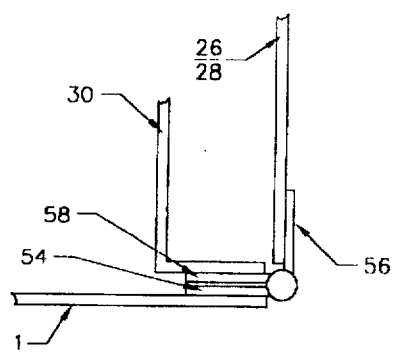
Figure 4:
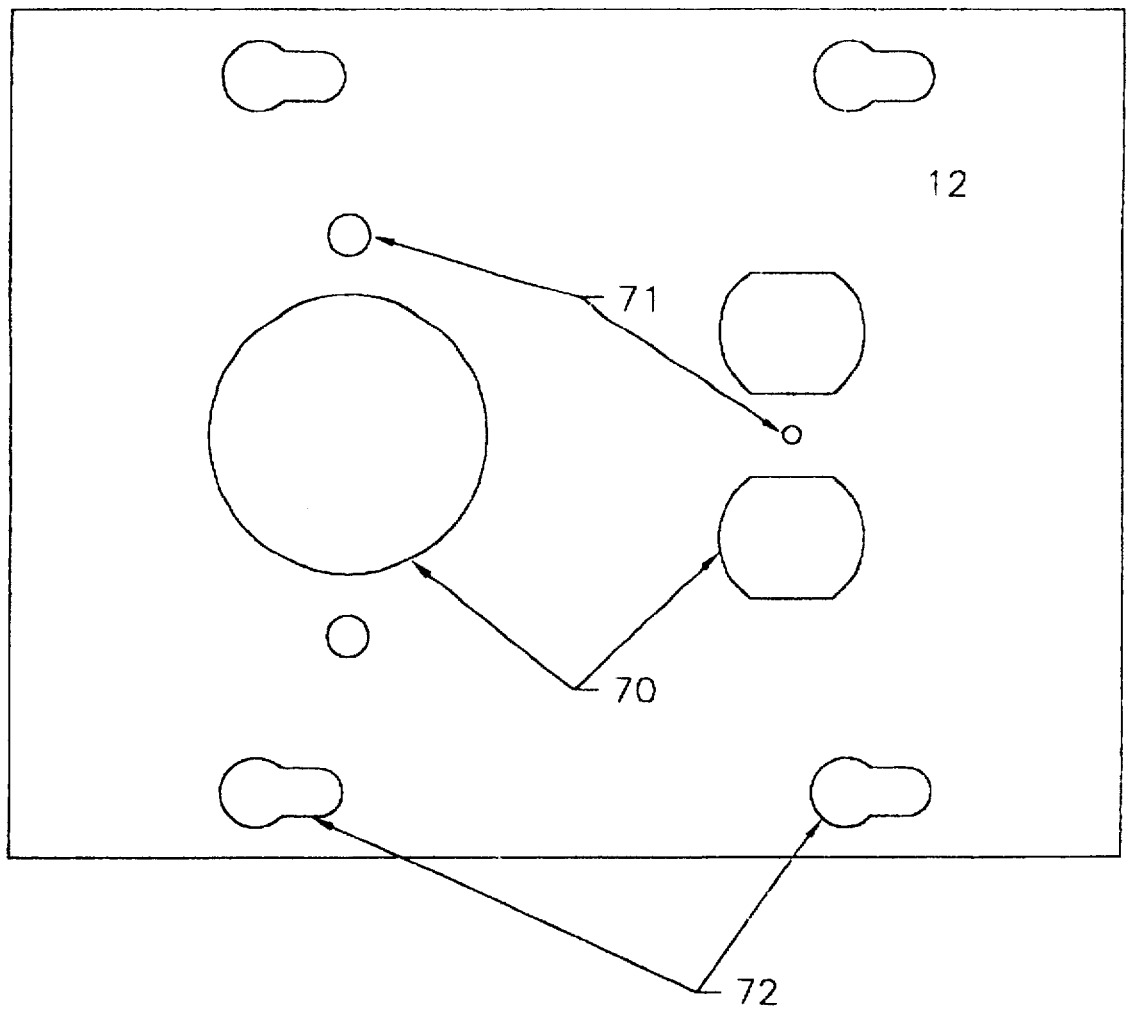

FIG. 3-5 shows the position of the leafs with the door and dead front both open 180 degrees.

The door 30 incorporates a latch 60 mechanism which cooperates with strike 62 which is attached to the dead front with suitable means.

The upper dead front has an opening 64 which fits closely with the optional main circuit breaker 16 or other disconnect means as is conventional practice. When open it provides access to the main breaker or disconnect and the incoming power compartment. It is secured in the closed position by suitable fastening means (not shown).

The lower dead front 28 has close fitting openings 66 for branch circuit breakers. When open it provides access for installation and removal of branch breakers, as well as for tightening breaker output lugs 68. It is secured in closed position by suitable fasteners.

Interchangeable quick change device plate modules 12 (see FIG. 4 for a typical example) may have a variety of openings 70 to mount electrical receptacles. Receptacles are secured to said plates by suitable fastening means (not shown) through holes 71. These openings fit said receptacles closely, obviating the need for additional cover plates. The receptacles are thus both supported and covered by these device plates. These plates may be employed without openings when receptacles are not desired in a particular location.

The receptacles will normally be of conventional design, although others may be mounted in the manner described. Also these receptacles 10 are connected electrically by insulated wire 14 to the neutral and ground bus and to branch breakers usually on the same level (between the same separator plates/safety dividers ) as the receptacles. This provides an obvious spatial association between the branch breakers and the receptacles they supply.

Power entrance cover plates provide access to make incoming power, ground, and neutral connections.

Auxiliary modules 12 are like device modules for power but are not restricted to mounting power receptacles. They may also mount, by way of example; data, signal, telecommunications, fiber optics, video, audio, gasses, vacuum, and other utilities.

Auxiliary sections(s) may mount circuit beakers also (not shown) or an entire circuit breaker panel interior duplicating that in the branch circuit power section. Two such systems may be stacked one on top of the other or back-to back or side-to-side (not shown). Such auxiliary sections may also be employed in a similar manner with the systems described as raceway or bus duct in nature.

All three types of plates/modules may be interchangeable; or sizes, mounting hole locations, etc. may be varied to restrict their mounting to certain locations. These modules may have keyhole-shaped fastener openings 72 to allow changing without removing fasteners. Obviously other fastening means, including but not limited to captive or ¼ turn fasteners may be employed as well.

The top plate 38 is provided with an opening 74 into which a commercially available connector (not shown) may be installed to connect the incoming power conduit or extension housing. If an auxiliary section is used, the top plate isolates it from the main power housing. It incorporates a flange, not shown but similar to the flange on the bottom plate, which serves as a stop for the upper dead front. Inlet power may also be supplied through openings in the other sections of the housing, either via conduit or flexible cord.

If an auxiliary section 20 is used, by itself, or with a second auxiliary section 20-1, it may be fitted with an extension housing 22 consisting of one or more tubes within tubes. (See FIGS. 7-1 to 7-3). The inner tube 76 will be long enough to pass through the length of the auxiliary housing(s) and connect with a connector (not shown) mounted in the opening 74 in top plate 38. This allows the incoming power to pass through the auxiliary section(s) while still being isolated from them. The inner tube generally will extend beyond the outer tube at the other end to allow it to be connected to the building power system. The space(s) 80 between tubes provides a separate shielded wire way into the auxiliary compartment(s) allowing different voltages, frequencies, etc. to be employed there. The upper end of the outer tube may be provided with holes 82 for the attachment of seismic bracing or other hardware. This extension housing 22 may vary from a few inches to many feet in length;

a long extension housing allowing feeding of power, etc. from overhead, like with power poles.

Figures 1, 7:
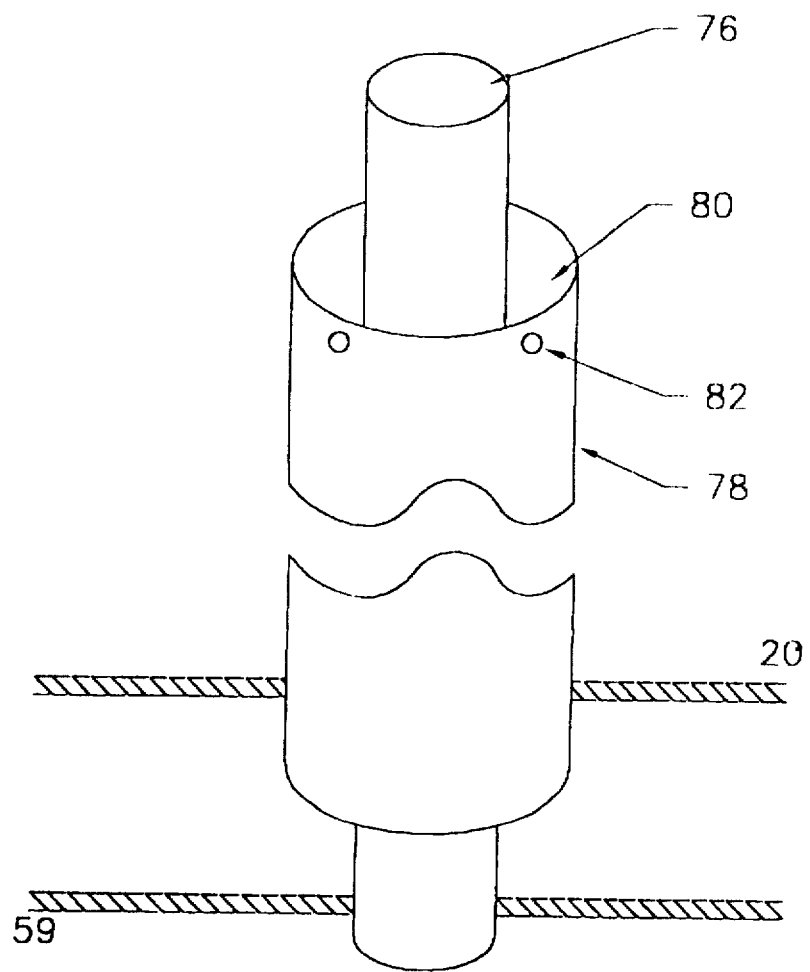
Figures 2, 7:
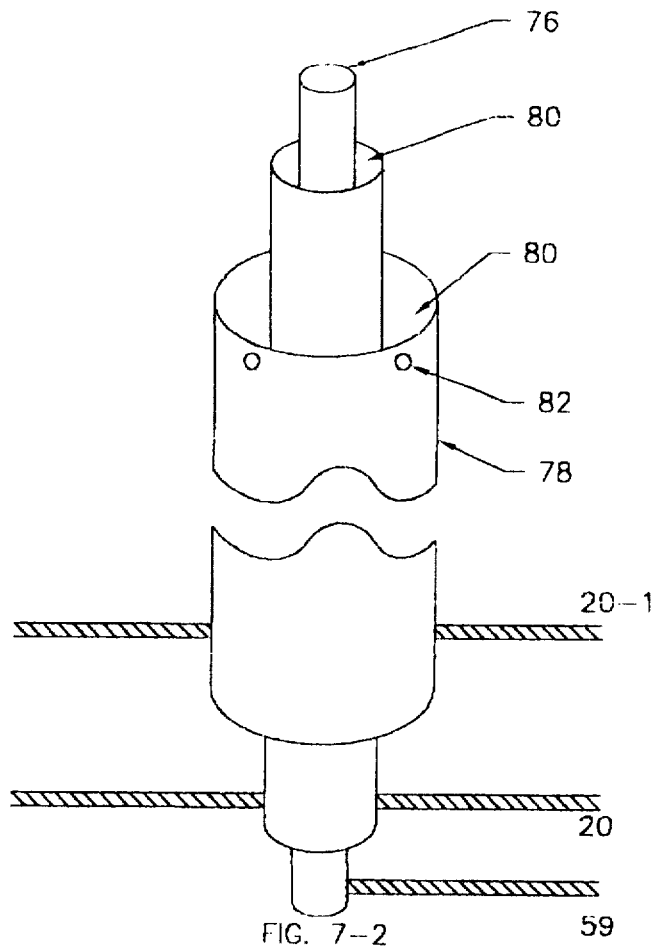
Figures 3, 7:
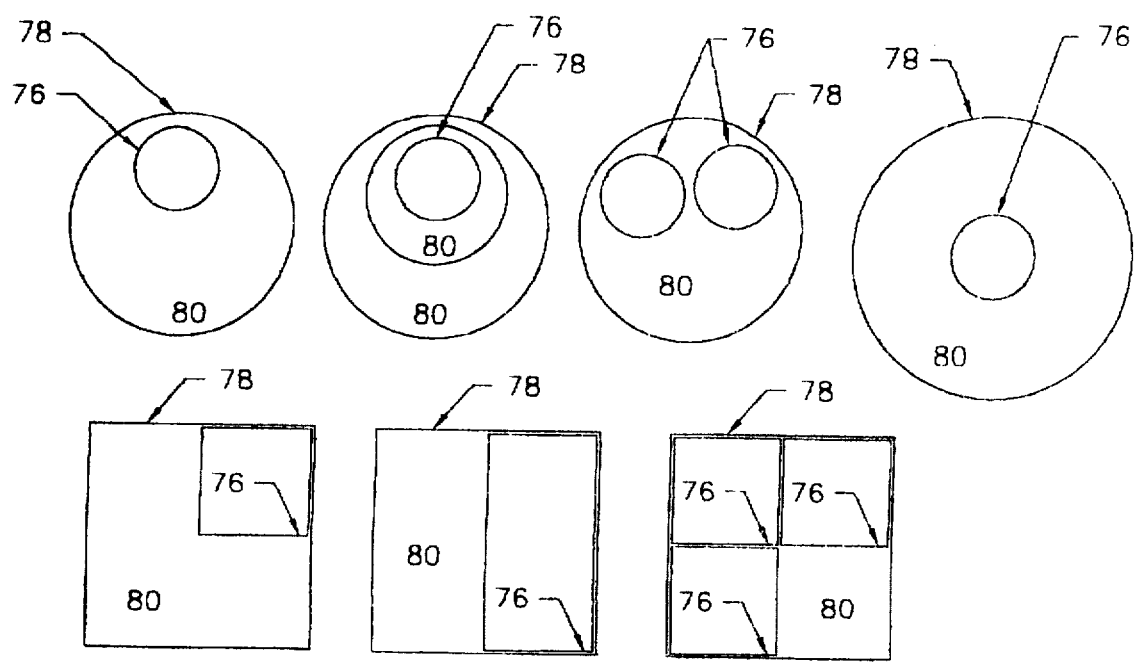

This extension housing may be of circular crosssection. It will be obvious to those skilled in the art that other cross-sections and internal arrangements are possible, a few of which are illustrated in FIGS. 7-2 and 7-3. Welds or fasteners (not shown) between inner 76 and outer 78 tubes may be spaced to allow tube assembly to be cut to length in the field.

FIG. 5a shows a typical prior art circuit breaker panel. The sidewalls of its enclosure 5 are located a distance 7 beyond the output end of circuit beakers 4 to provide circuit breaker output wiring working space. As is conventional practice, the wiring working space 7 is inside the enclosure resulting in a large enclosure. As is common practice tool working space 57 for the circuit breaker output lugs is from the front and largely outside the enclosure. (As illustrated by screw driver 9, which is not part of the invention.)

Figure 6:
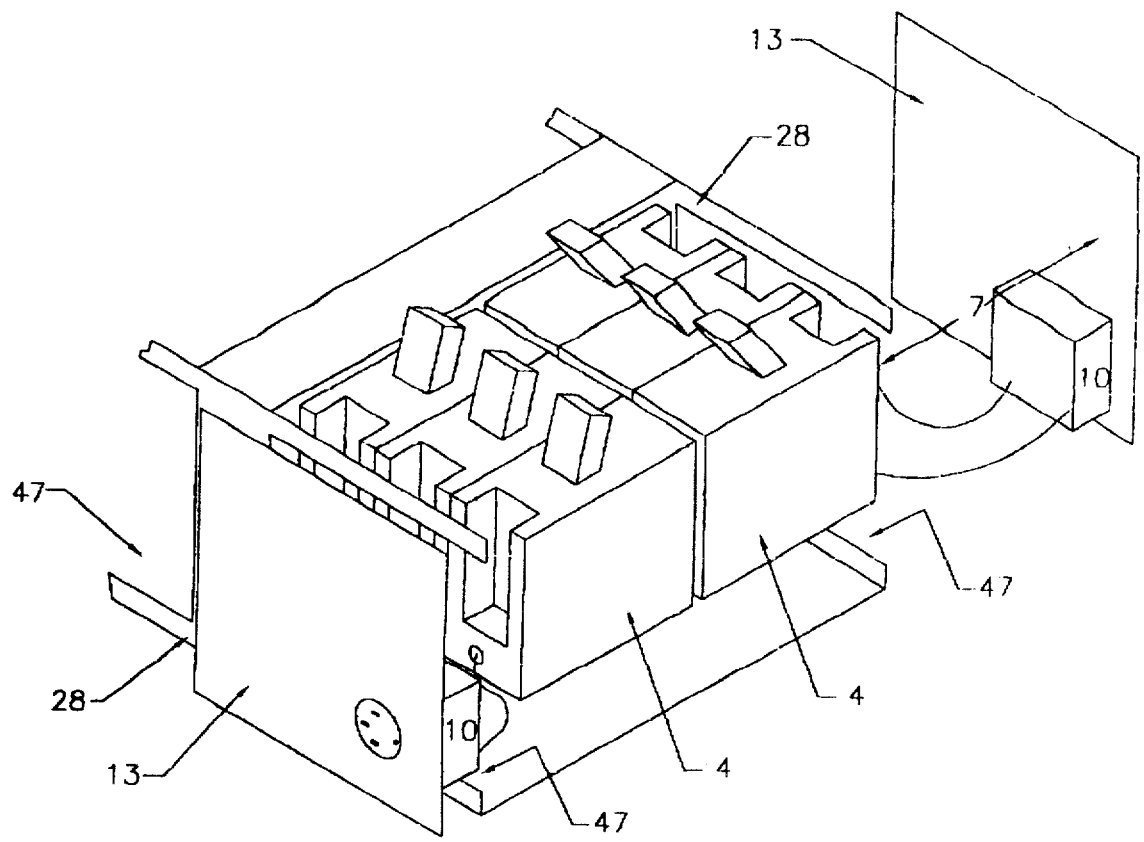
FIG. 6 shows in perspective a preferred example of working space provided outside the circuit breaker panel per the invention.

FIG. 6 shows an improvement according to the invention, wherein the required circuit breaker output working space 7 is provided outside the enclosure, allowing the enclosure to be much smaller. The enclosure need only extend marginally beyond the circuit breaker. The outside working space is made available by the moving of removable or openable plate 13 which may also mount one or more receptacles 10 or other devices if desired, said receptacles being mounted rearward of the branch circuit breakers. It can also be provided by removable box type modules or other openable or removable structures.

According to the invention, by providing access openings 36 on plural sides of the enclosure 1, the housing can be made smaller in size, and at the same time, installation and/or changes in receptacles, breakers and the like is speeded up and made safer. Mounting receptacles directly to their "cover plate" or other structure is not per se new, but in combination with enlargement of working space and reduction in size of the housing is unique. The arrangement of this invention which uses an openable access panel to provide the required circuit breaker wiring working space may be employed for either the inlet or the output of the breaker, or both.

Figures 1, 9:
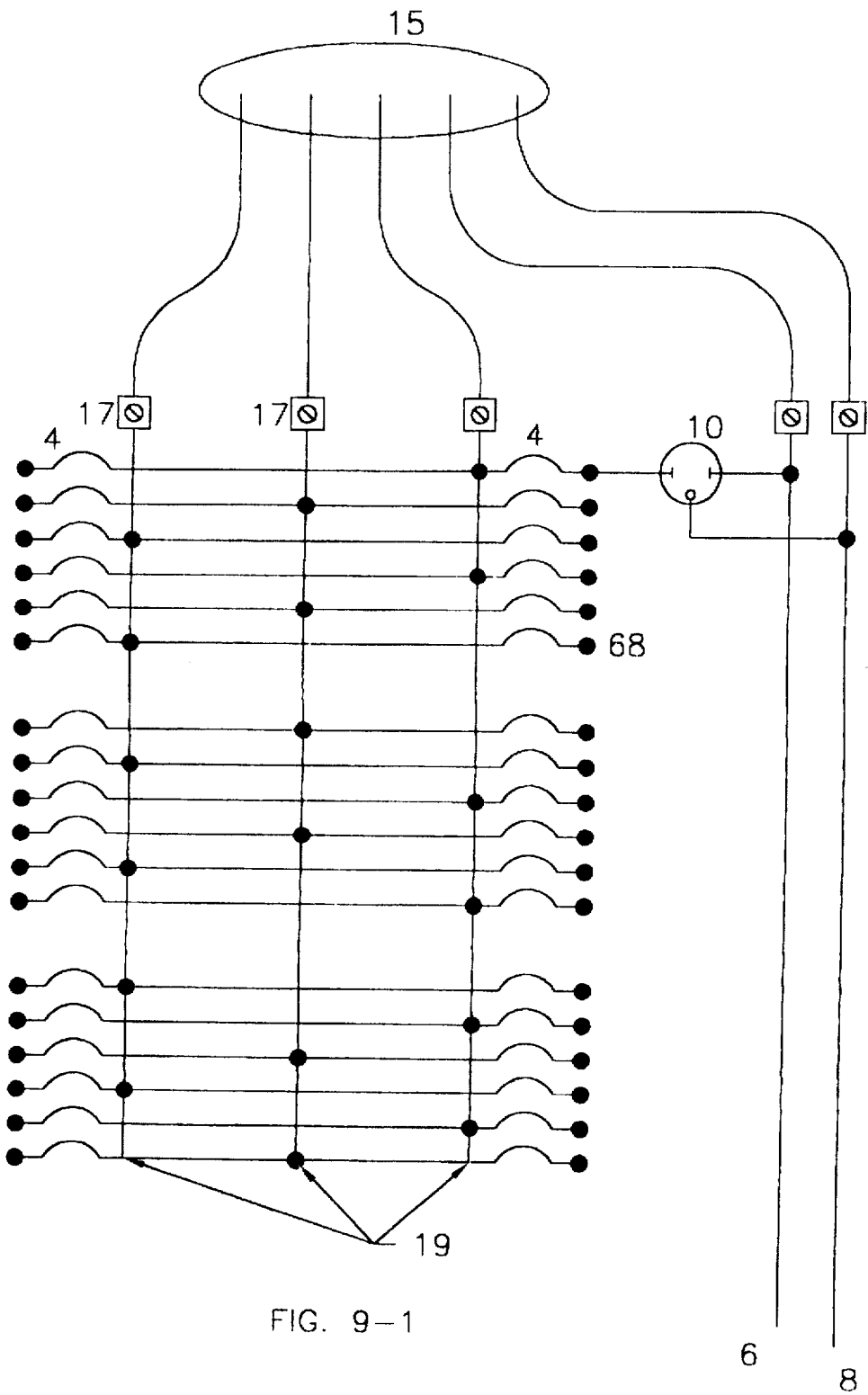

The electrical system shown in FIG. 9-1 is conventional prior art with inlet power 15 going directly to main lugs 17 on the power bus 19 with no local overload or disconnect capability. However, the location of the neutral and ground busses behind the interior as shown in FIG. 2, which allows full length busses without adding width to the housing, is novel.

Figures 2A, 9:
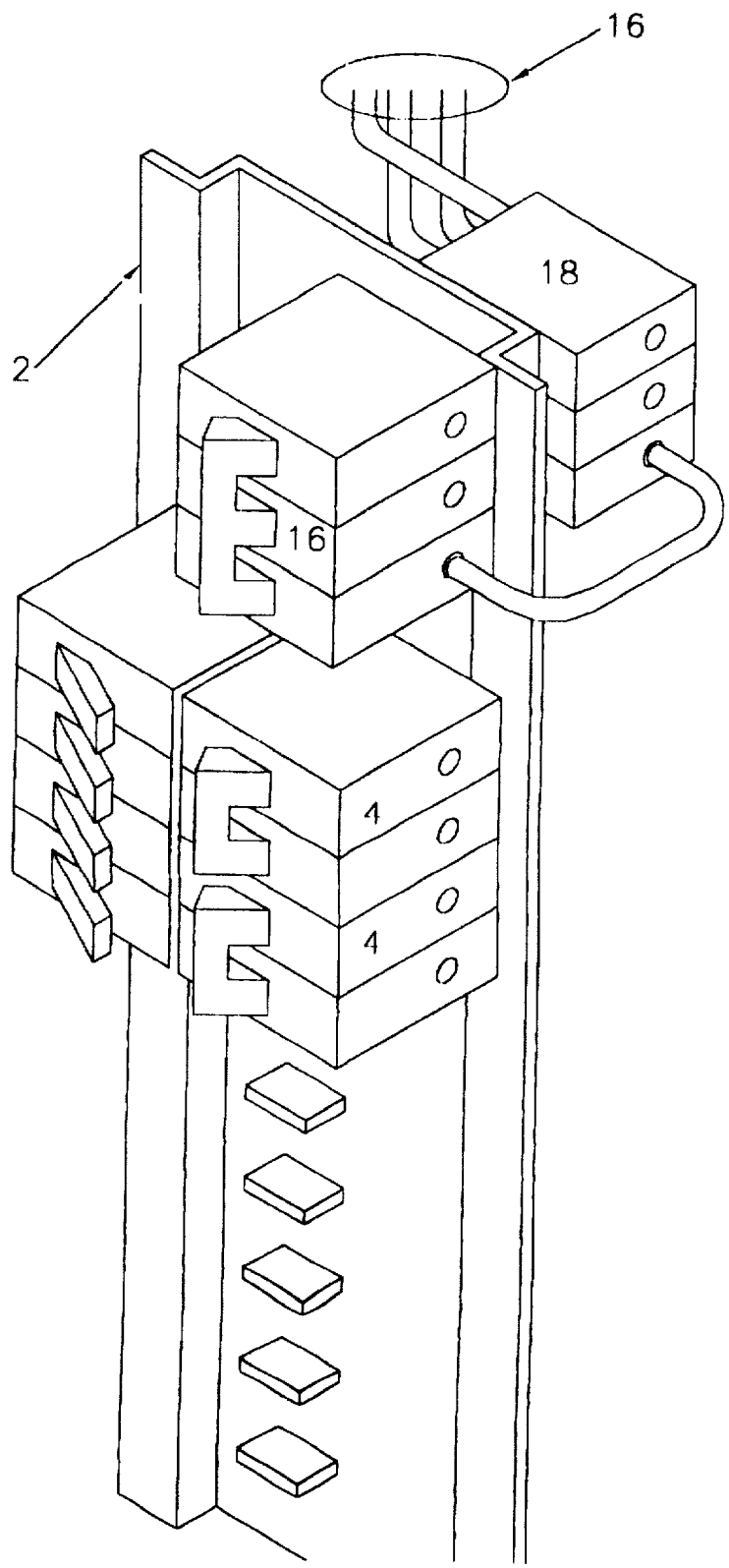
Figures 2S, 9:
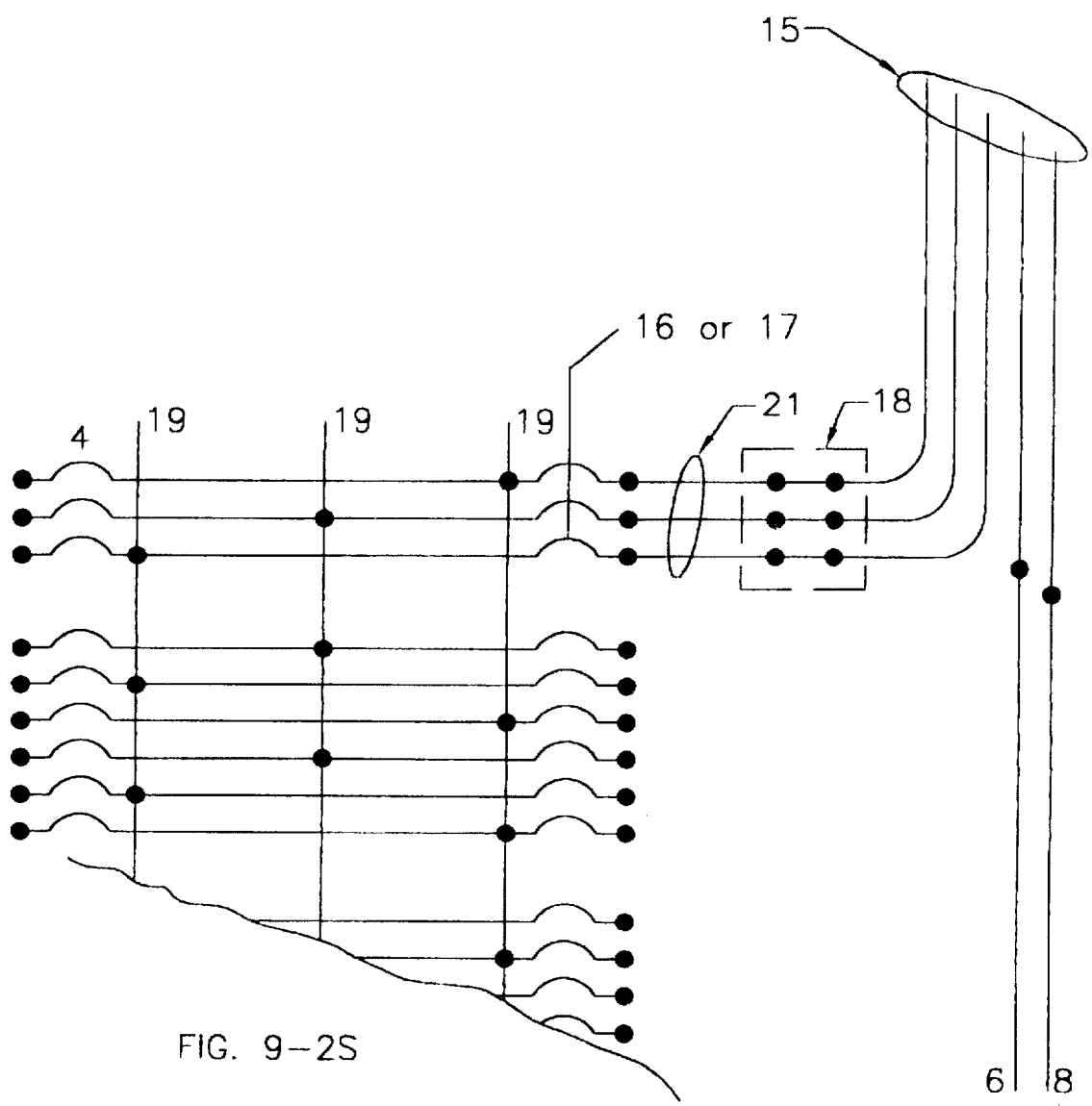

The embodiment of the invention shown in FIG. 9-2a and 9-2s utilizes remote (from bus) incoming power lugs 18 located behind the panel interior assembly 2 and connected to the power bus 19 via jumpers 21 and main lugs 17, main breaker 16, or main disconnect (not illustrated).

Figures 3A, 9:
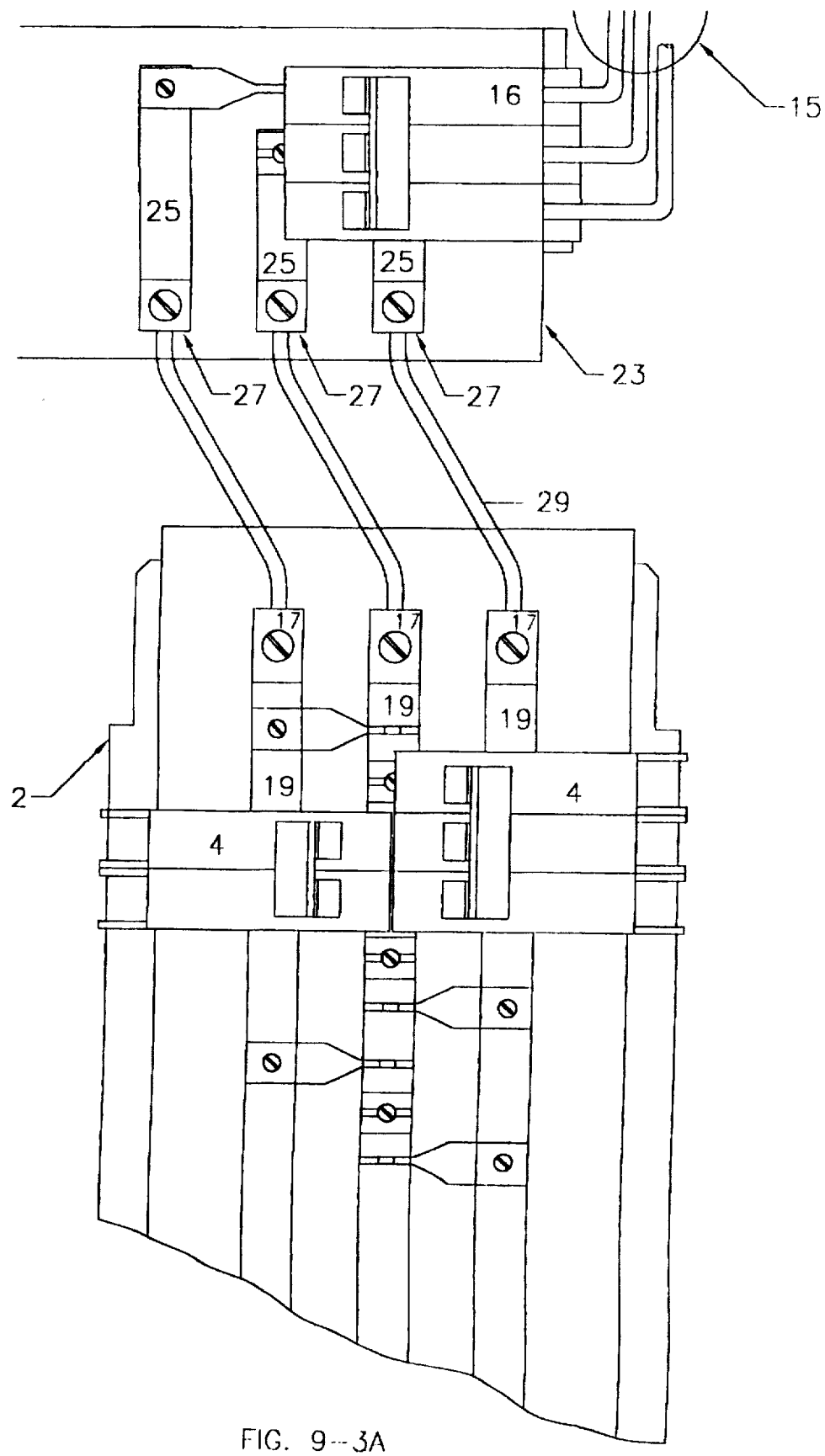
Figures 3S, 9:
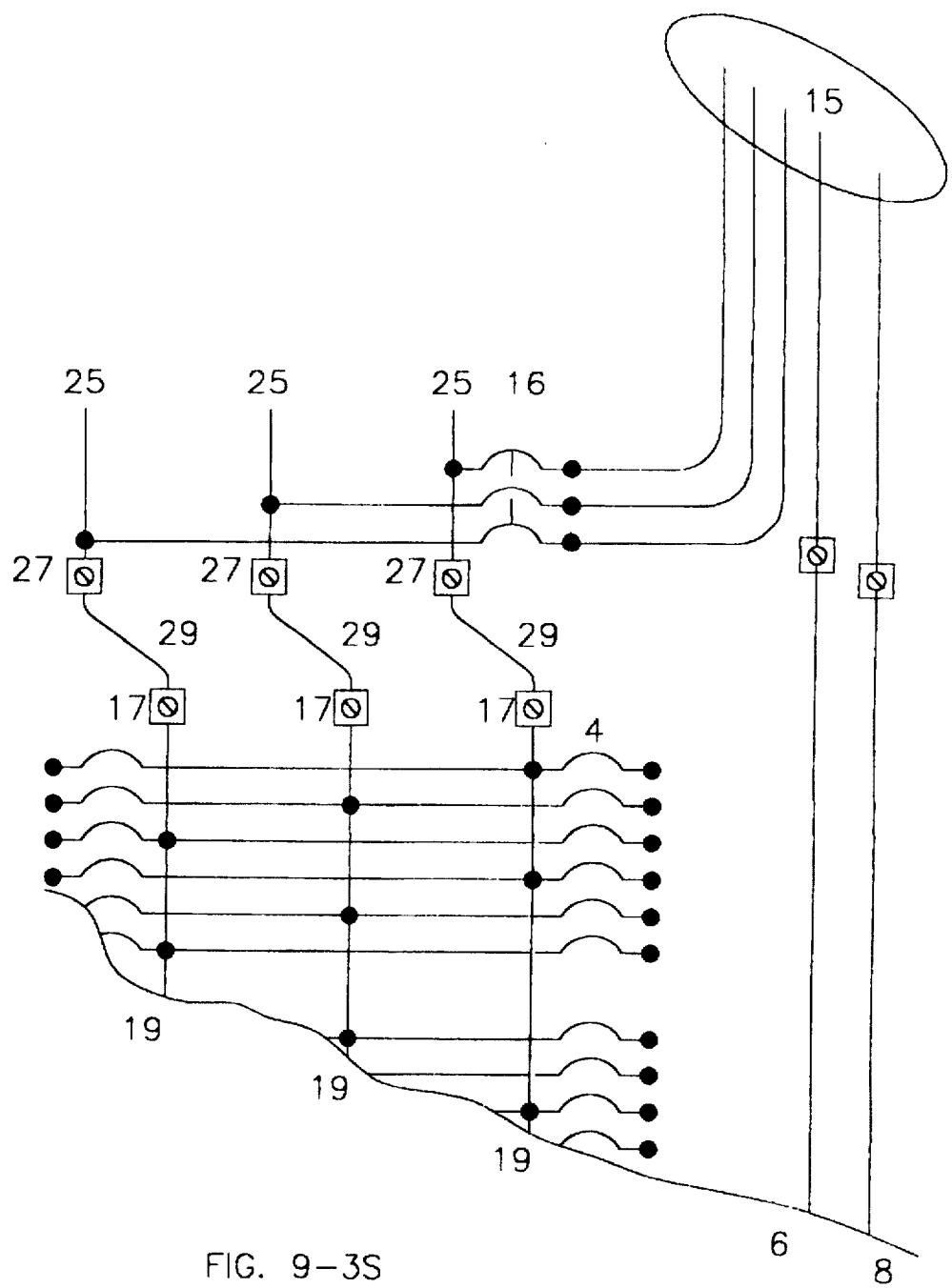

The embodiment shown FIG. 9-3a and 9-3s brings incoming power 15 directly to the main breaker 16, it being back or reverse fed, which is connected to a main breaker interior assembly 23 that is offset from a separate branch breaker interior assembly 2. The main breaker bus 25 then connects via lugs 27 and jumpers 29 to the branch breaker interior assembly 2 via lugs 17 and bus bars 19.

The embodiments of the invention shown in FIGS. 9-2a, 9-2S, 9-3a and 9-3S both make use of space available elsewhere in the housing to provide increased bending and working space for connection of field wiring without increasing the size of the housing. The connection point has been changed allowing a smaller housing. Obviously these offsets could be accomplished with a single unitized offset interior/bus assembly if desired.

Referring to FIGS. 9-1 to 9-35, the "interior" 2 typically includes one or more power busses 19 (two or three being most common). Each power bus 19 is intended to be connected to one leg of the incoming power and has provisions to connect and support branch breakers 4 at various locations along its length. These connections 31 may be of the quick connect or bolt-on-type. The quick connect type offering the advantage of faster and safer branch breaker changes without deenergizing the interior. The busses are, of course, insulated from each other and from any metal used in their support structure.

When installed, the building neutral is intended to be connected to the neutral bus 6 via insulated conductor. Building ground is to be connected either via a conductor to the ground bus 8 and/or via grounded building conduit system through the metal enclosure to the ground bus. This does not depart from standard practices.

Neutral 6 and ground busses 8 (FIG. 8-1 to 8-3) may be of any suitable design. Generally, they are constructed of a single piece of conductor employing holes for the insertion of wires and intersecting cross holes for pressure screws to bind said wires. The neutral and ground busses may have one or more lugs (not shown) attached to allow the attachment of larger conductors than the previously mentioned holes would allow.

In conventional prior art practice (FIG. 8-1), all the binding screws 33 are oriented in one direction and the wire holes 35 in another. The wire holes are either blind or through drilled. This arrangement allows wires to enter the bus from one or two directions, both in the same plane. It allows binding screw access from only one direction. In the preferred embodiments (FIG. 8-2 and 8-3) of this bus binding screw access is possible from more than one side. Screws are located on alternate sides allowing access from two sides. Other configurations are possible and contemplated though not illustrated. Both binding screws and wire holes can be oriented to any number of sides. Individual wire holes may also have binding screws with more than one orientation. Wire holes may be through or blind.

The multiple direction access feature of this invention is useful and novel whether the bus is for neutral or ground as in this panel or for power, signal or any other purpose in some other unrelated application.

The bus bar need not be of rectangular cross section.

Figures 1, 8:
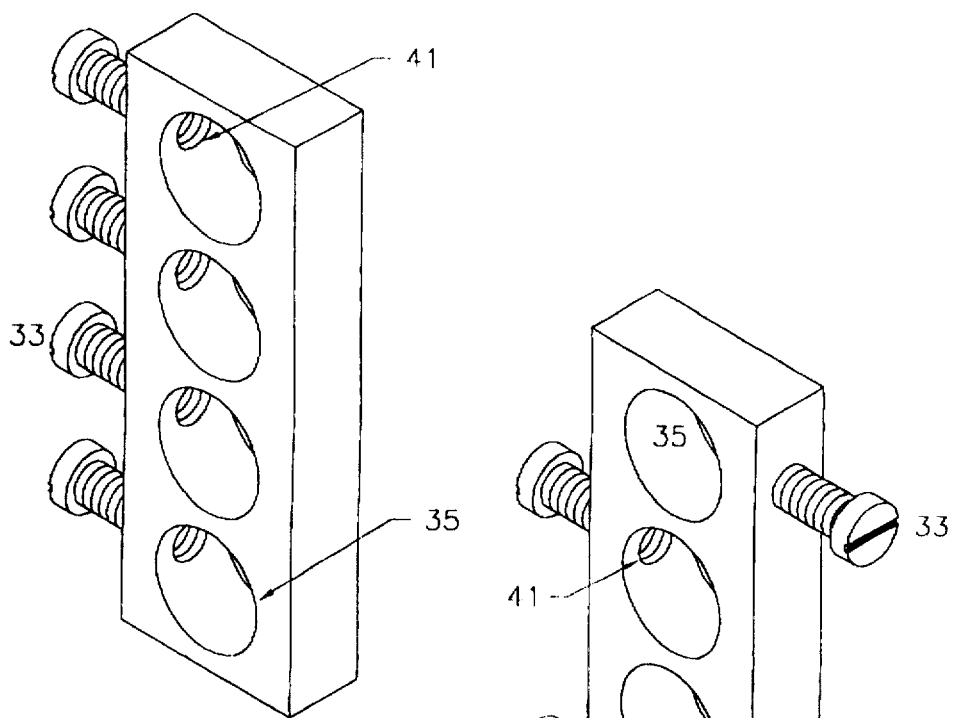
Figures 2, 8:
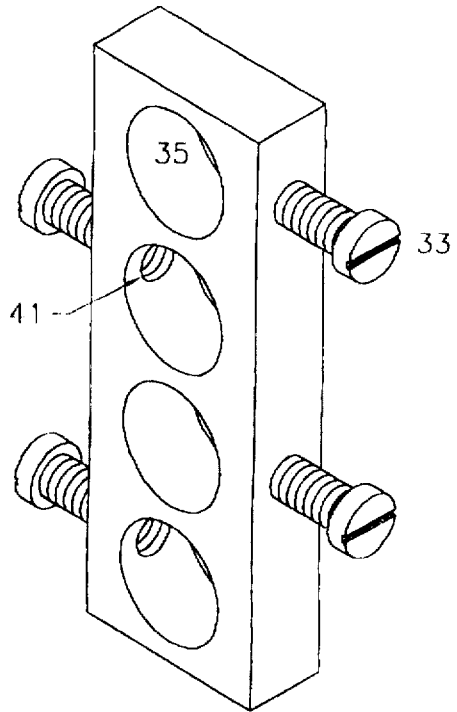
Figures 3, 8:
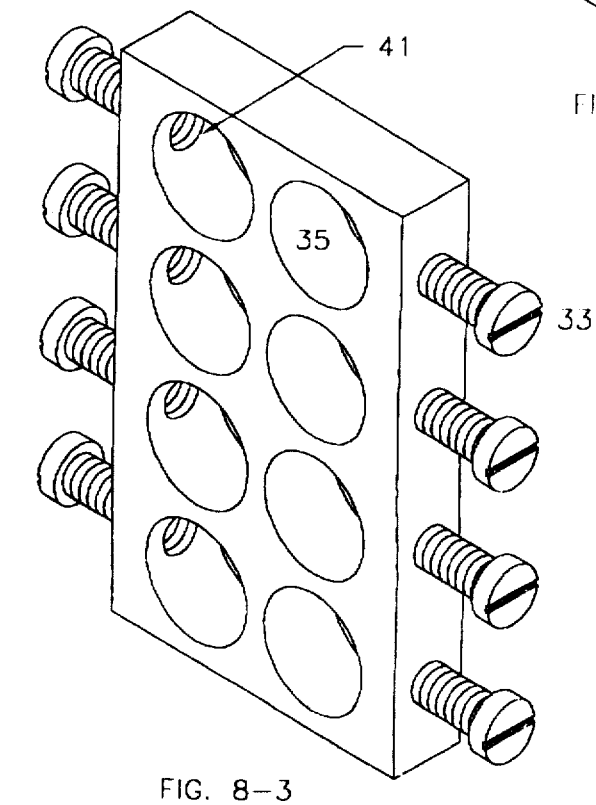
Figures 4, 8:
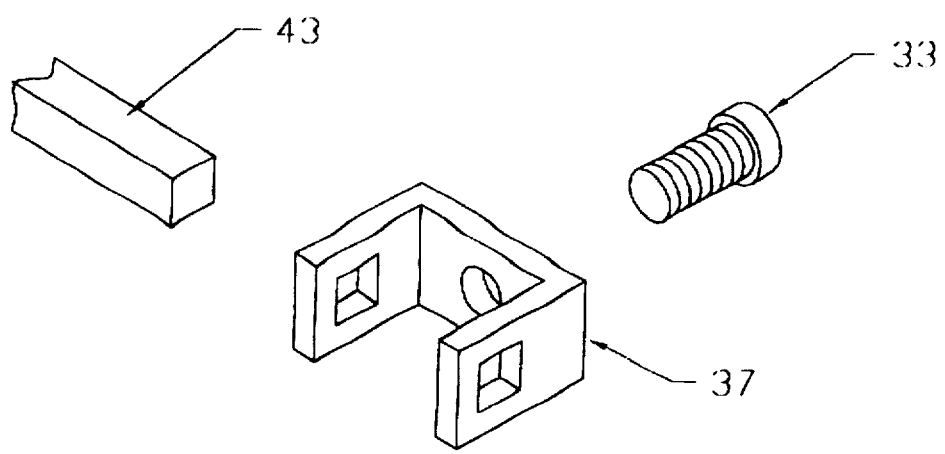

The prior art system of FIG. 8-4 utilizing slide-on lugs 37 on a bus bar 43 can be assembled with wire binding screws in different orientations.

Figures 1, 10:
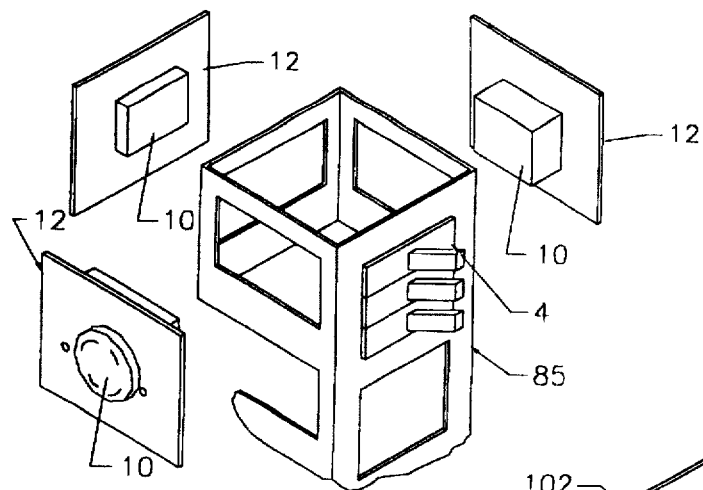
Figures 2, 10:
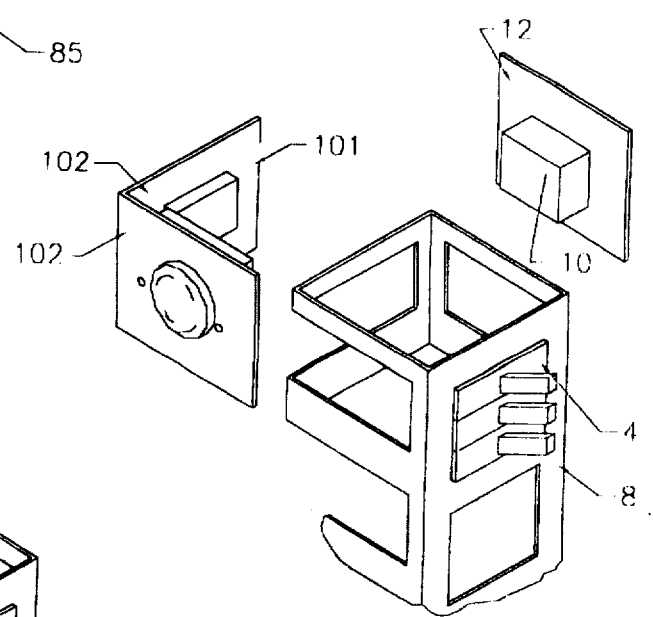
Figures 3, 10:
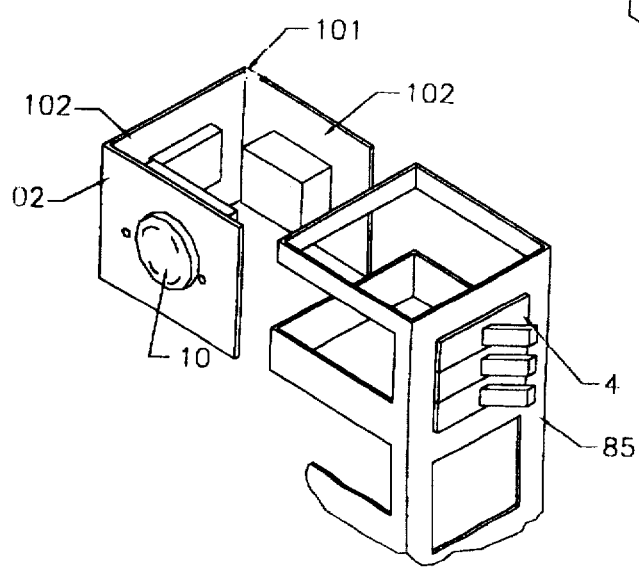

FIG. 10-1 shows plate-type modules 12 which mount one or more receptacles 10 and do not provide for the mounting of circuit protection means. Said modules may be interchangeably attached to the panel board enclosure 85 on one or more sides. A single stack of circuit breakers 4 is shown but it could utilize a double stack as well.

FIG. 10-2 is a variation on FIG. 10-1 where the platetype modules 101 are in the form of two intersecting plates 102 with provisions for mounting receptacles 1 0 to one or both plates. Circuit breakers 4 may be arranged in a single or double-wide stack.

FIG. 10-3 is a variation of FIG. 10-1 where the platetype modules 101 are in the form of three intersecting plates 102 with provisions for mounting receptacles 10 to one or more faces. Circuit breakers 4 may be arranged in one or two columns.

In the arrangements shown in FIG. 10-1 through 103, the receptacles 10 receive their power from branch breakers 4 via wires (not shown) and their neutral and ground connections are provided by wire, bolt on connections, push-on connections, or combinations thereof (not shown). Box-type modules which mount only receptacles on one or more faces of the box are also possible and generally parallel the plate-type modules illustrated in FIGS. 10-1 through 10-3 in functional locations for receptacles. Plate-type modules could also be used to support only circuit breakers, or circuit breakers and receptacles.

Figures 1, 11:
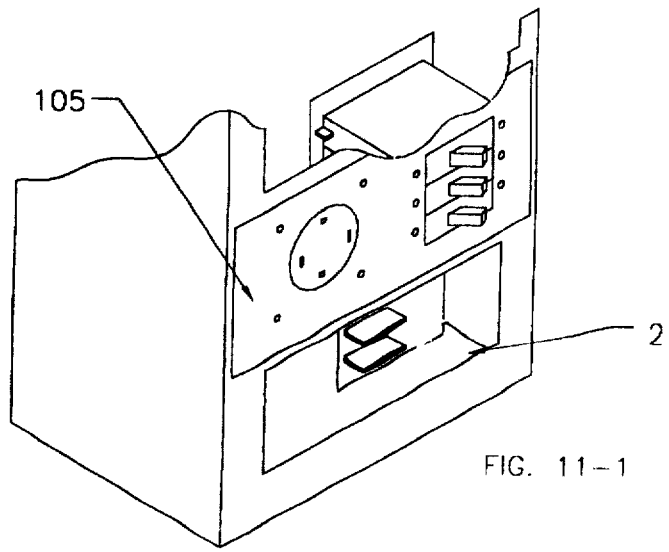
Figures 2, 11:
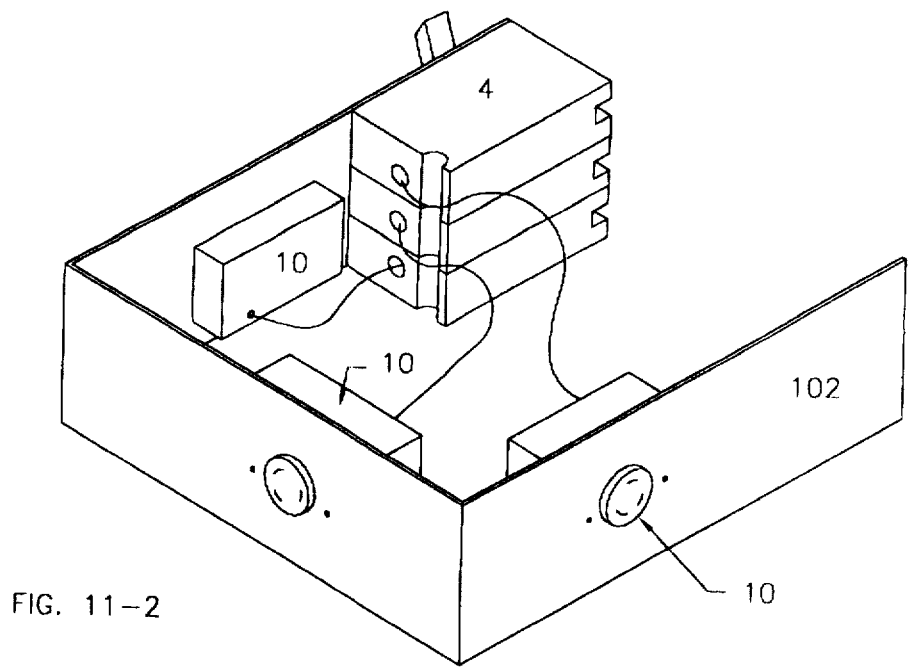
Figures 3, 11:
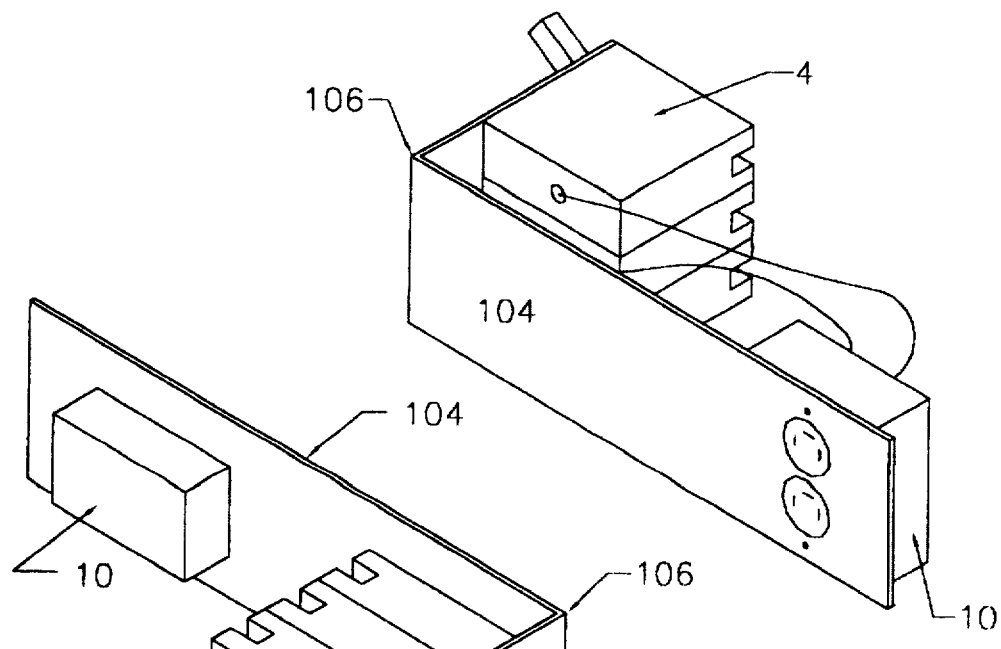
Figures 4, 11:
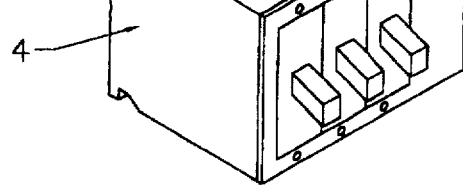
Figures 5, 11:
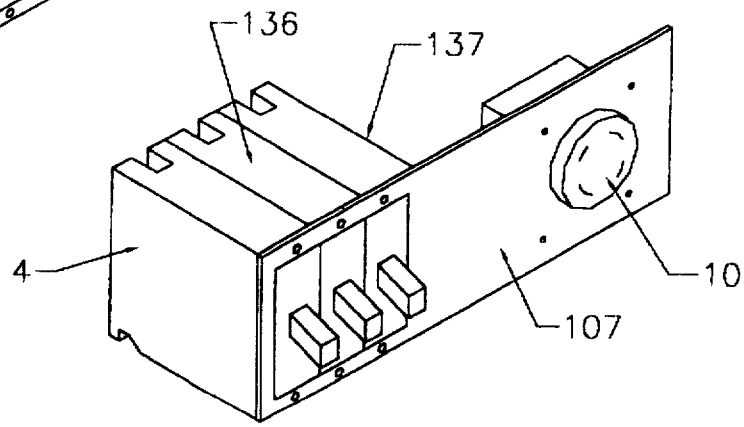

FIG. 11-1 shows a system employing modules 105 of generally plate-like construction which support both circuit protection means 4 and the receptacles said protection means supply 10. This illustration shows a system employing a single stack of breakers. This module concept is part of the prior art (see U.S. Pat. No. 4,080,644 among others). The module is intended to attach as a unit to a circuit breaker panel and to be interchangeable with other modules. In the prior art when two modules are installed adjacent to each other there is no overlap of the plates to prevent objects from being inserted between said plates. Back up strips may be added to provide plate overlap.

Figures 1, 15:
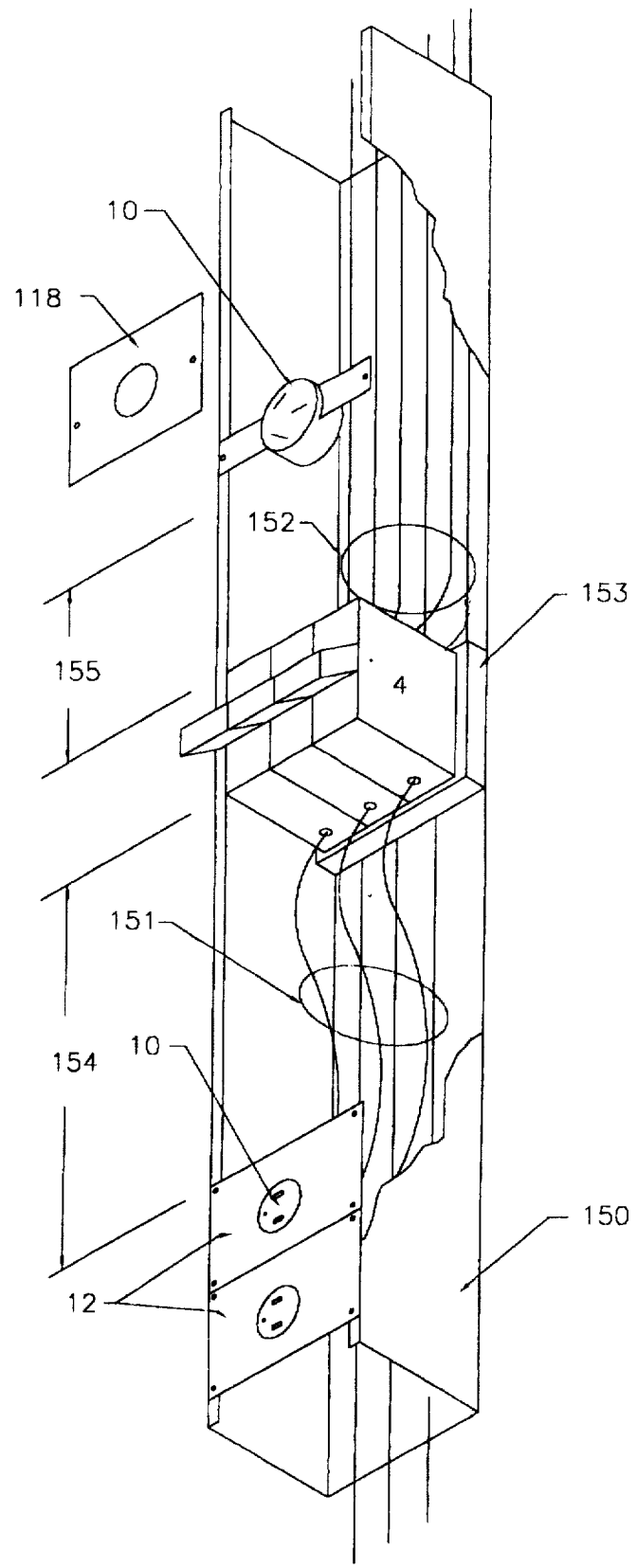
Figures 2, 3, 15:
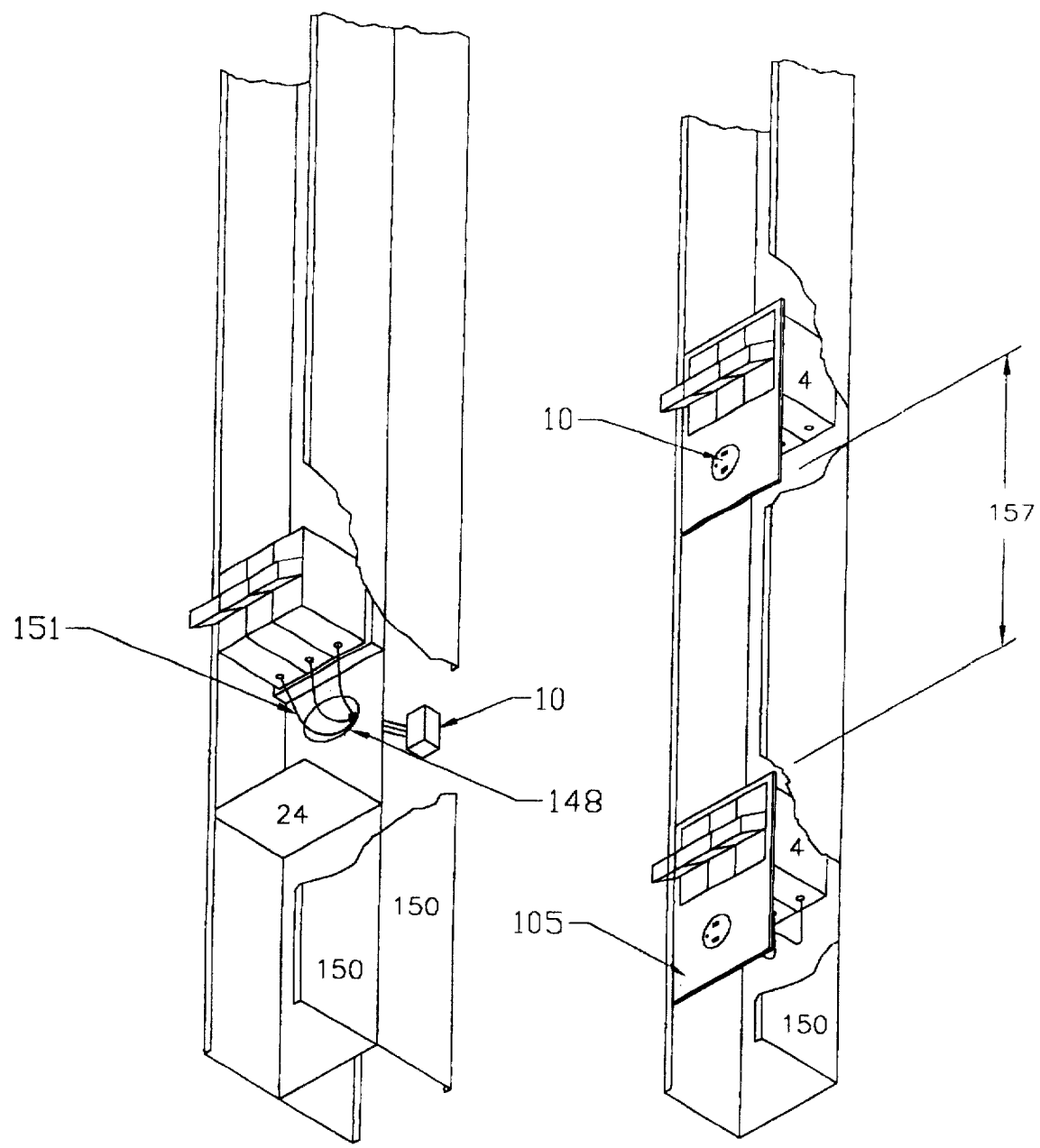

This module is not new per se but it may be employed in novel combination with raceway, bus duct, or other special housing configured to allow said module to be placed end-to end rather than side-by-side as is conventional practice (see FIG. 15-3). Placing them end-to-end allows the construction of a pole-like assembly with a width approximating the module width and a depth approximating that of the circuit breakers plus bus system. This results in an unprecedented reduction in foot print size for a panel with receptacles.

FIG. 11-2 shows a variation on FIG. 11-1 where the module 106 structure is of three intersecting plates 102. Any number of pates may be employed, with receptacles mounted to them as desired.

FIG. 11-3 shows a variation of the module in FIG. 11-1 except that the plate 105 has been folded close to the breaker output terminals so that the module extends only marginally beyond the output end of the circuit breakers. This same strategy may be applied to the other modules as well.

FIG. 11-4 shows a variation where the receptacle face is in a plane parallel to the plane of the arc of the breaker handle swing.

FIG. 11-5 shows a variation on FIG. 11-1, but with the receptacle 10 located adjacent to the side 136 of the circuit breakers, rather than adjacent to the end 137 of the circuit breakers. There are many variations possible and contemplated along these lines.

Figure 12:
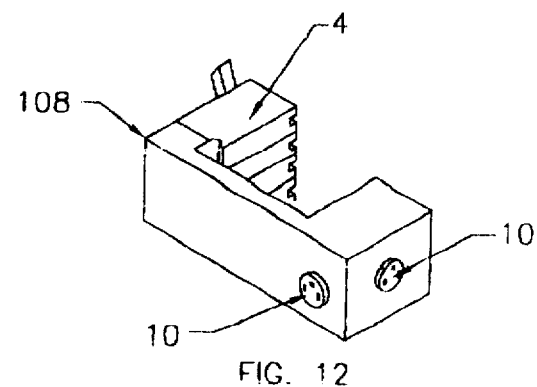
FIG. 12 shows in perspective a preferred embodiment of a box-type module which incorporates both circuit breakers and receptacles with the receptacle being integral with the box housing.
Figures 3, 13:
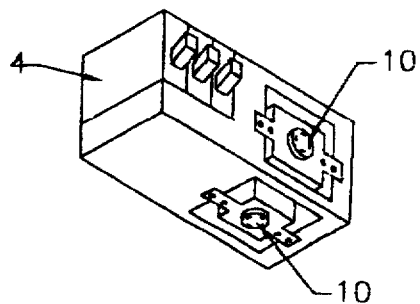
Figures 2, 13:
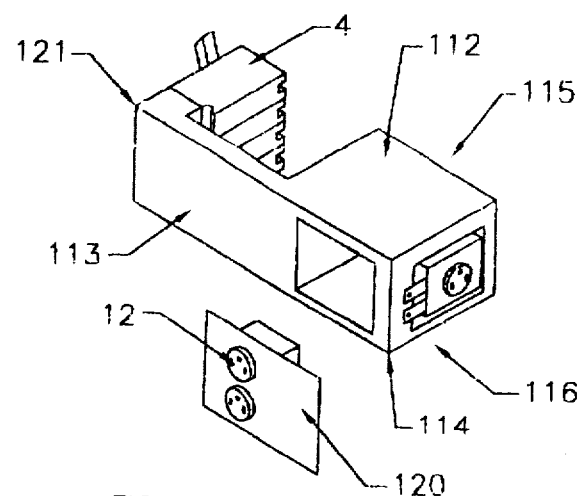
Figures 4, 13:
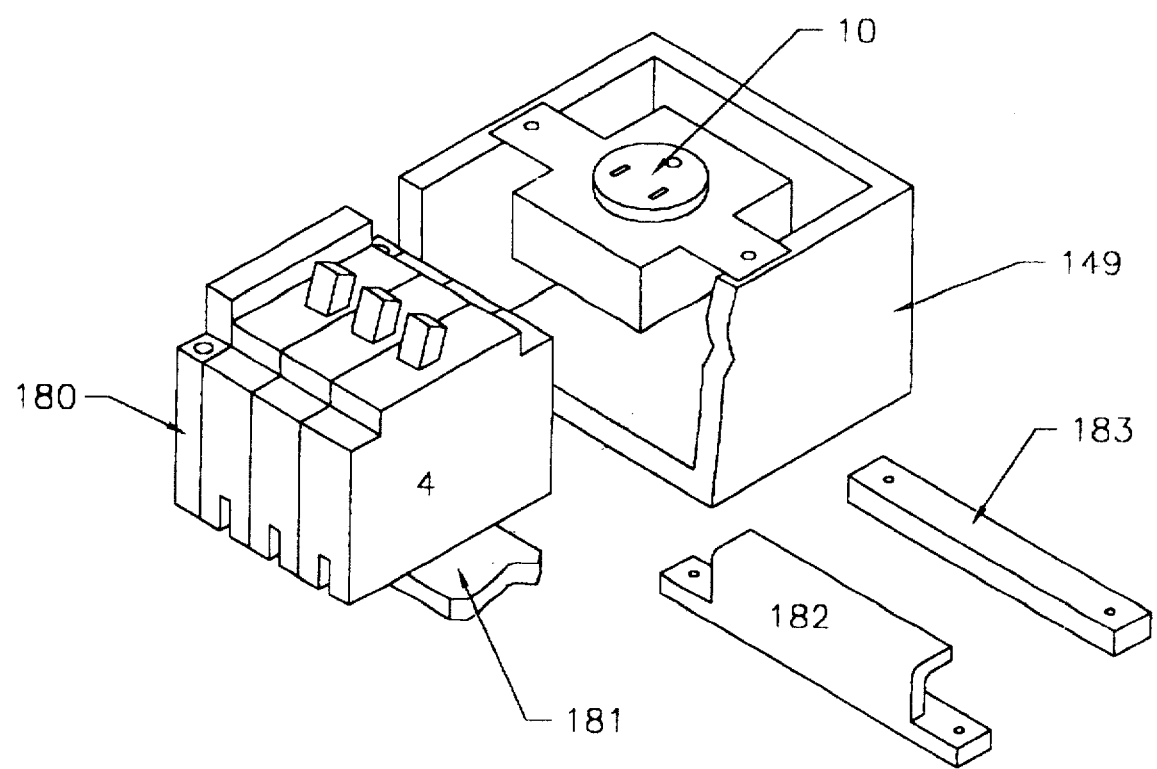

FIG. 12 shows a box type module 188 that integrates receptacle components directly into the module itself. That is, the receptacle's component parts have no housing of their own but rely on the module for support positioning and electrical insulation. Once assembled this module cannot have its receptacle(s) changed to a different type. It can not mount industry standard self contained complete receptacles at all. Said module may either be made integral with its circuit breaker 4 or only provide mounting for a separate circuit breaker. The entire assembly however, including circuit breakers, mounts to the power panel as a unit.

This is similar to the prior art box type module disclosed by Buxton, except that his module allows the receptacle to be located only in the same plane as its circuit breaker, and adjacent to, it's circuit breaker output connectors. It is also claimed for use only with circuit breaker panels of typical mobile home entrance service design, not with raceway, power pole, buss duct type systems, nor even with panels designed to be as narrow as possible.

Figures 1, 13:
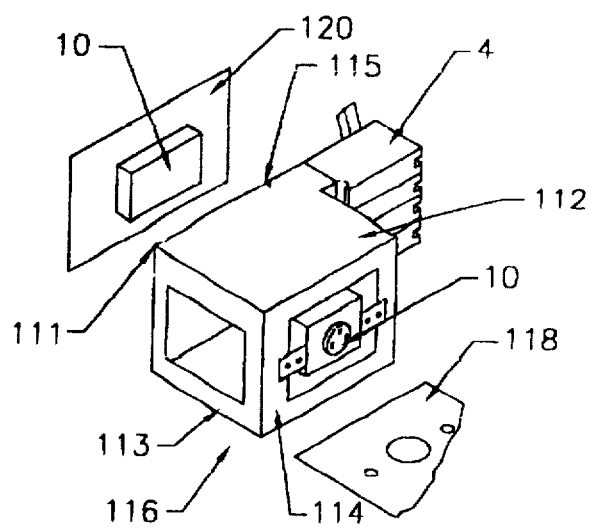

FIG. 13-1 shows a box type module 111 which is designed to be attached to circuit breakers 4 in such a manner that the entire assembly may be removed or installed as a unit. The receptacle box may have one or more openings on one or more faces 112, 113,114, 115 and 116, which allow the interchangeable installation within that box of various combinations and/or sizes of receptacles 10. Receptacle 10 may mount to the module 111 and be covered with suitable cover plates 118. Alternatively, receptacles may be mounted to a close fitting plate 120 which serves both as a mounting structure and a cover plate. Unused openings will, of course, be covered by blank plates. The box may, of course, be fabricated without openings on all the sides. Receptacles 10 are powered by a suitable means (not shown) via the breaker output terminals (not shown). The module may be either constructed as a factory assembly or in such a manner that the number and/or amperages of the circuit breakers and receptacle type may be change in the field.

The prior art U.S. Pat. Nos. 3,743,891 and 3,818,282 by Buxton disclosed a plug-in combination receptacle/circuit breaker module that is similar to the module shown in FIG. 13-1 except that the prior art module provides only a special receptacle that is factory integrated with the box-type housing and may not be changed after assembly. This prior art also shows only one such receptacle and locates it only adjacent the output end of the circuit breaker and only in the plane of that face of the circuit breaker that extends through the dead front.

FIG. 13-2 shows a variation on the module shown in FIG. 13-1 where the receptacle box type module 121 is configured to allow the assembly to be only marginally wider than the circuit breakers 4. Receptacles 10 of various types and sizes may be interchangeably mounted in openings in one or more sides 112, 113, 114, 115, 116.

FIG. 13-3 shows yet another variation on FIG. 13-1.

The box-type module 149 shown in FIG. 13-4 allows circuit breakers 4 and receptacles 10 to be interchanged. The module encloses the circuit breakers between side walls 180. The bottom of the module is cut out to allow the breakers to connect to the bus in the normal manner. Circuit breakers are placed in the opening between said side walls and rest upon support piece 181. They are held in place by a retaining bar 182 which may incorporate a handle to facilitate removal of the assembled module from the BUS, and retaining bar 183 which may be integrated with the plate that closes the remainder of that face of the box. Receptacles may be interchangeably mounted to the box through openings which may be located in faces as illustrated in FIGS. 13-1, 13-2, and 13-3.

FIGS. 12, 13-1, 13-2, and 13-3 show no details regarding the securing of the receptacle box to the circuit breakers or the necessary electrical connections. The cited patents show one method of accomplishing this. FIG. 13-4 shows another. Many others are possible.

Receptacle and breaker modules may be of unitary or integral construction employing a single housing in which the components making up the circuit breakers and receptacles are mounted, or be an assembly of "stand-alone" componets such as circuit breakers in their own separate housings and receptacles in their own separate housings assembled together with some adapter means but installed as a unit. i.e. receptacles can be factory integrated with the enclosure while circuit breakers are changeable, or circuit breakers may be integrated with the enclosure while receptacles are changeable, or FIG. 13-4 both breakers and receptacles may be changeable. Neutral and/or ground bus connections of bolt-on or push-on design may be integrated into any of the modules.

Figures 1, 14:
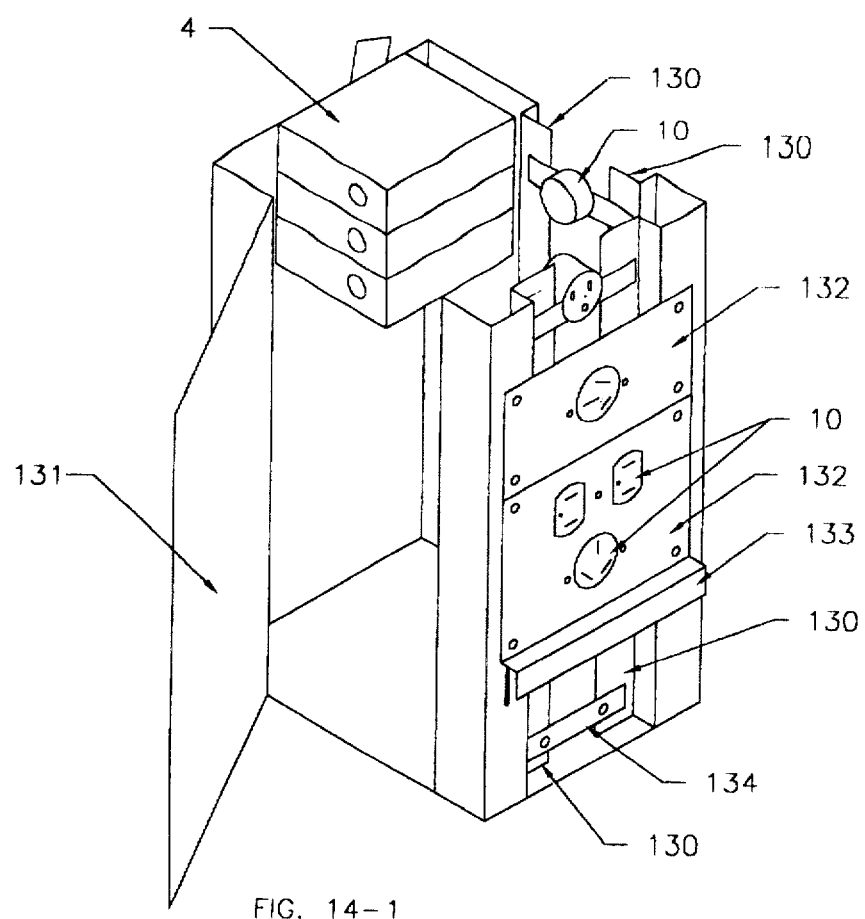
Figures 2, 14:
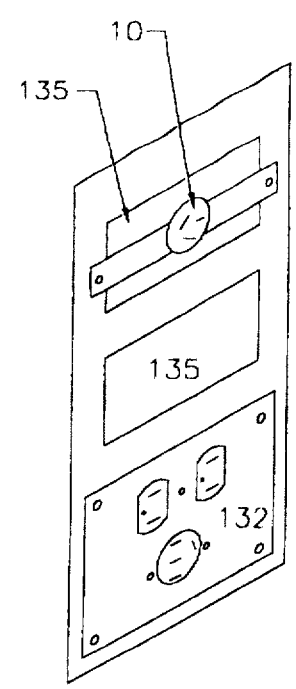

FIG. 14-1 shows a variation of FIG. 1 adapted to mount receptacles 10 directly and interchangeably to recessed surfaces 130 and providing wiring working space outside of said enclosure accessible by removing or opening cover 131, which may be hingeably supported if desired. Receptacles so mounted will be protected by cover plates 132, which may be of variable size. The cover plate is shown with an optional offset flange 133 to provide required overlap at the joint with the next plate. Alternatively, removable cross pieces 134 may be positioned to close the gap between standard type cover plates. The openable cover 131 may be constructed with openings to mount receptacles if desired, and may be split into two or more separately removable/openable sections if desired (not shown).

FIG. 14-2 shows an alternative form for receptacle openings in the device of FIG. 14-1 with multiple fixed size openings 135 instead of one long opening on each side. This allows the use of standard cover plates 132 sized to fit said fixed openings while still providing required overlap at all edges.

The embodiments shown in FIGS. 14-1 and 14-2 may of course be employed with both single or double wide columns of circuit breakers.

FIG. 15-1 shows a prior art raceway system that is commercially available. It includes a generally U-shaped housing ISO which is designed to provide an enclosure for wires 151 and 152, receptacles 10, and circuit breakers 4; and a mounting means for receptacles and circuit breakers. Circuit breakers 4 may be wire fed as shown and may mount in any conventional manner. Power input connections may also be made by bolting to or pushing onto a base 153 designed for that purpose, or branch breaker feed wires 1 52 may connect directly to circuit breaker incoming lug screws. These systems have no provision for power bussing. As presently available, this system can only mount receptacles on one side and the receptacles and circuit breakers must be on the same side. It is adaptable to interchangeably mount and feed a variety of receptacles with different boss and gang sizes.

Because of working space required at the breaker output 154, breakers can not be immediately adjacent to receptacles, but may be near to them. Receptacles may be mounted on interchangeable plates 12 that do not incorporate means for mounting circuit protection means, or directly in opening in raceway in which case a cover plate 118 will be used All systems on the market align the longest dimension of the circuit breaker in the same direction as the long axis of the enclosure. This system requires a great deal more space than its components, because the working space for wiring the components is in between said components and internal to their enclosure. Both circuit breaker input working space 155 and circuit breaker output working space 154 add greatly to the length of the system, thus limiting the number of receptacles and circuit breakers that can be installed to a fraction of what would physically fit. These systems utilize wire fed circuit breakers. The wires feeding each successive set of circuit breakers must run by all the previous sets contributing to raceway congestion/crowding. Each circuit breaker must be fed with a conductor able to carry the highest allowable branch current or else the conductor must be changed to match new current requirements when circuit breakers are changed (a highly disruptive procedure). In other words, branch breaker ampacity is limited by the size of branch breaker feed wire which must be duplicated for every circuit breaker, rather than by the size of a bus which feeds all the circuit breakers. These systems do not employ power or neutral busses, nor do they employ ground busses except in the sense that the enclosure itself is sometimes used as a grounding system.

If circuit breaker bases are 153 factory wired, or a bus system is added (see FIGS. 15-4, 15-5, 15-6, 15-7) than the length required for the circuit breaker inlet space will be substantially eliminated, but space will still be required between the receptacles and the circuit breaker for output wiring.

FIG. 15-2 and FIG. 15-3 show improvements to the system illustrated in FIG. 15-1. In FIG. 15-2 the improvement involves attaching two "U" shaped housings 150 back-to-back (this by itself is not new), providing wire openings 148 between them, locating receptacles 10 on the side opposite circuit breakers 4, and feeding receptacles via wires 151 through said openings. As illustrated here, the circuit breakers are wire fed, though other feed systems are possible. This arrangement has the advantage that the length or space required for wiring the circuit breaker input may also be used as the space required for the previous circuit breaker's output, allowing for a much shorter housing. By locating receptacles on the other side in the other channel, they add no length to the system as a whole, allowing still further length reductions. Safety separators 24 of any suitable design may be fitted to provide a barrier against accidental contact with adjacent components while working on the system.

Alternatively, the receptacles and circuit breakers may be in the same channel, with the circuit breakers being fed by wires run in the other channel and routed to the breaker inputs via openings (not illustrated).

If circuit breaker inputs are factory wired to circuit beaker contact base 153, then minimal length is required in the circuit breaker raceway to provide input connections. This allows the housing to be shortened by most of the length formerly required to feed the circuit breaker. This benefit accrues whenever circuit breaker inputs are factory wired, regardless of where the wires are run. But to have field change capability with factory wiring of the inputs requires a circuit breaker contact base. It also obviates the need to run input wires for succeeding circuit breakers directly past the preceding circuit breakers, shifting this congestion to the other "U" shaped raceway. The circuit breaker output wiring space 154 is still required. Alternatively a bus system may be provided in the channel housing the circuit breakers.

FIG. 15-3 Shows an embodiment employing a single "U" shaped housing 150, designed to mount and house combination receptacle/circuit breaker modules 105. (Shown here is a particular variation of a plate-type module but the various box-type modules will work also.) These modules may be of any of the various types illustrated herein. The modular mounting of circuit breakers 4 and receptacles 10 as an assembly, with circuit breaker to receptacle wiring being done on the module prior to installation, allows the elimination of the circuit breaker output wiring space and allows the receptacle to be mounted partly or completely in the circuit breaker inlet space for the next set of circuit breakers. If the circuit breakers make their input connections via bolt-on or pushon bases that are factory wired or are bussed, the space 157 between the receptacles fed by one circuit breaker set and the input to the next circuit breaker set may approach zero. In other words, the required circuit breaker input space may be reduced to a dimension not substantially greater than that required for a receptacle, and shared with that receptacle. Modules may abut one another resulting in a system whose length is only marginally greater than the lengths of all its receptacles and circuit breakers.

FIG. 15-4 shows a bus 158 of more or less conventional prior art design equipped with connection stabs 159, which may be of any suitable design, for providing electrical input connection to circuit breakers 4 or other components. This push-on arrangement is not new per se, but its use in a raceway system like this is new.

FIG. 15-5 Shows a bus 160 of more or less conventional prior art design provided with tapped holes 161 for bolt-on connection with fastener 158 to circuit breaker or other inputs.

FIG. 15-6 shows a wire-on bus of conventional prior art design 162 with binding holes for wire 163 intersecting taped holes 164 for wire binding screws 165.

FIG. 15-7 shows a prior art bus constructed of wire 166 with branch wires 167 connected with suitable connectors 168. This system lacks some of the compactness of the other BUS systems illustrated.

Any of the bus systems illustrated may be insulated or bare. They may have a safety shield if desired. The bus types may be combined in a single assembly with one type used to feed circuit breakers and another to supply ground connections and still another to supply neutral connections if desired. Mounting means for connecting circuit breakers and supporting them are well known and not illustrated here .

FIG. 16-1 shows a prior art bus duct system of a type in common use, it includes a system of busses 176 for power distribution, insulation and support means for said buss (not shown), an enclosure 169 for said busses, taps 170 for electrical access to said busses, and tapping boxes 171 which connect to said busses via said taps. These tap boxes may contain circuit breakers 4 and receptacles 10.

The tap boxes are very large, typically manly times larger than the components they house, there being little reason to make them small. They are used for heavy-duty power distribution.

The tap boxes thus protrude in at least two directions a long way past the bus duct itself, presenting a highly irregular profile to the viewer. The taps on the bus duct are located rather far apart 173, typically on the order of several feet. This results in a large distance 172 between tap boxes installed in adjacent taps (Said distance being many times the dimensions of a circuit breaker). Again, there has been little incentive to change this because of its intended use. These systems locate the branch circuit breakers and receptacles in the same plane.

FIG. 16-2 and 16-3 illustrate a new and improved bus duct system with a continuous opening for tapping the busses. Obviously, closely spaced discrete openings will work also. Most of the modules described elsewhere in this specification (with or without branch circuit protection means) can be mounted and electrically fed by such a system. The bus duct housing may be designed in such a manner that these very small modules do not protrude beyond the bus enclosure, if desired. The module does not need to be substantially wider or taller than the size of the branch circuit protection means. The modules may be installed immediately adjacent to each other.

FIG. 16-2 shows a combination receptacle/branch circuit breaker box-type module 111 (see FIGS. 13-4 and 13-1) installed on a bus duct-type base 169.

FIG. 16-3 is a variation on FIG. 16-2 having the sides of the bus duct enclosure 169 extending to partly or totally cover the sides of the module, and provide some protection for the circuit breaker handles. Optional openings 174 in the sidewall allow side mount receptacles. These general arrangements are suitable for use with the majority of the modules disclosed in this specification.

These raceway and bus duct-type systems may have one or more dead fronts and/or covers or doors and may also mount receptacles on the breaker side or other side or on a plurality of sides of the housing. An extension housing may be employed with these systems or the main enclosure or raceway or bus duct may be lengthened to any desired dimension. Receptacles and/or breakers may be recessed if desired. These systems may be inverted and fed from the bottom, or simply fed from the bottom without inverting. Obviously the feed could also enter via one of the module or receptacle mounting locations normally used for outputs.

Any of the modules illustrated in this disclosure may be adapted for use with a raceway or bus duct type system, or the raceway or bus duct adapted to use them. Any of the systems illustrated may include safety separators between various components to enhance safety. Raceway/bus duct cross-sections are usually "U" shaped, but nothing inherently restricts them to that shape and many of the features disclosed here apply to other shapes as well. Any of the raceway systems illustrated here may be equipped with a main circuit breaker if desired, regardless of how the branch circuit breakers are fed.

The modules disclosed in this specification may receive power via bussed or wired circuit protective devices. Said modules may be installed in a suitable circuit breaker panel of either standard or novel construction. They may also be installed in a raceway or bus duct system, which will sometimes require modification of one or the other. When so installed, power, neutral, and ground connections to circuit protective means or receptacles may be provided by push-on, bolt-on or wire-on means or combinations thereof. The circuit breakers may be configured in either single to double rows or other suitable pattern.

All of the modules may be constructed to mount receptacles either via close fitting openings or larger universal openings requiring a cover plate. In the sampling of module types shown, modules occupying three-dimensions have all been shown with 90 degree angles between their various faces or sides. They may however be constructed with various angles, with receptacles in various planes, with curved surfaces, etc. without departing from the spirit of the invention.

Though illustrated for only a few of the combination circuit breaker/receptacle modules, they may all be constructed in such a manner that the module does not extend substantially beyond the circuit protection means. Likewise, safety barriers between components may be included either in the module design or in the enclosure it mounts to.

Plate overlap functions are possible even where not illustrated. Numerous other variations in module design and mounting/wiring means will be apparent on examination.

The various modules and other mounting strategies shown in figures beginning with FIGS. 10, 11, 12, 13, and 14 when used in circuit breaker panels, raceway, or bus duct systems may be so configured as to allow said modules and/or circuit breakers to be changed without deenergizing the entire system or physically disturbing the other modules or load connections. When circuit breakers and modules are mounted separately, these systems allow said breakers to be located in obvious spatial relationship with the receptacle modules they feed. Receptacles may be interchanged with ones of different boss or gang size without cutting or otherwise modifying the enclosure itself.

While all connection points to power electrical loads have been illustrated as employing receptacles, any of these systems may also be used to provide directly wired outputs to loads without employing a receptacle.

As shown in FIG. 1, any of the enclosures may be fitted with an extension housing to make it tall enough to reach the ceiling for overhead feed. It may also be placed on a base, which may have provision for mounting receptacles, to raise the circuit breaker section to any desired height.

This invention includes the following:

The various types of modules for receptacles only, and for branch circuit protection and receptacles. (The modules by themselves).

The special parts that make up the above modules.

The special panel, bus duct, and raceway systems to utilize said modules.

Panels, bus duct and raceways in combination with the modules.

The bus with binding screws accessible from more than one side, by itself and in combination with any or all of the above.

The invention encompasses a combination of receptacles and over-current protection means where the housing/enclosure does not extend substantially beyond the output end of the circuit protection device, or where it does not extend substantially beyond one or more of the other breaker dimensions. The invention also encompasses a combination of receptacles and over-current protection means having wired neutral and/or ground bus systems as well as over-current protection adjacent to the receptacles allowing for fast, easy, obvious wiring and allowing for minimum length of enclosure.

While preferred embodiments of the invention have been shown and described, it will be appreciated that various adaptations and modifications will be apparent to those skilled in the art without departing from the spirit and scope of the invention.

What is claimed is:

1. A circuit breaker panel comprising:

a plurality of circuit breakers including output means, means to mount said circuit breakers, at least one electrical power receptacle, and an enclosure with a dead front on a first side thereof, said first side is defined as a front of said panel, and said dead front includes at least one opening therein, said enclosure includes on a second side thereof at least one access opening of sufficient size to allow manual access by a user to an interior of said enclosure so that the user can make required electrical connections, said second side of said enclosure being adjacent to said first side of said enclosure, said enclosure further includes means to mount said electrical power receptacle so that outlets of said electrical power receptacle are exposed on said second side, a third side, or a fourth side of said enclosure, said panel further comprises at least one power bus assembly; such that the user gains access to connection elements of said electrical power receptacle and to said output means of said circuit breakers through said access opening, thereby minimizing a distance between said connection elements of said electrical power receptacle and said output means of said circuit breakers, while allowing the user working space to establish a connection between said electrical power receptacle and said output means of said circuit breakers, said working space being independent of enclosure size in that said working space is largely in an exterior of said enclosure.

2. The circuit breaker panel of claim 1 wherein:

at least one ground bus or at least one neutral bus are contained in said enclosure, each of said ground or said neutral buses comprise a rigid, elongated conductive element with a plurality of means to receive and secure a conductor, said means to receive and secure conductors are spaced along a longitudinal axis of said ground and said neutral buses.

3. The circuit breaker panel of claim 2 wherein:

said means to receive and secure a conductor are situated on each of two sides of said ground or said neutral buses.

4. The circuit breaker panel of claim 2 wherein:

said ground or said neutral buses are located behind said power bus assembly.

5. The circuit breaker panel of claim 1 wherein:

said panel includes a power input means to receive input conductors, said power input means being offset from a longitudinal axis of said power bus assembly.

6. The circuit breaker panel of claim 5 wherein:

said power input means is from the group comprising main breaker, lug block, main disconnect, and fuses.

7. The circuit breaker panel of claim 1 wherein:

said panel includes a power input means to receive input conductors, said power input means is located behind said power bus assembly.

8. The circuit breaker panel of claim 7 wherein:

said power input means is from the group comprising main breaker, lug block, main disconnect, and fuses.

9. The circuit breaker panel of claim 2 wherein:

said means to receive and secure a conductor of said ground and said neutral buses are situated on each of two sides of said rigid, elongated conductive element.

10. The circuit breaker panel of claim 1 wherein:

a means to mount electrical receptacles is included in at least one of said access openings.

11. The circuit breaker panel of claim 1 wherein: said dead front is attached to said enclosure by means of a hinge.

12. The circuit breaker panel of claim 1 wherein:

said dead front is covered by a door, said door is attached to said enclosure by means of a hinge.

13. The circuit breaker panel of claim 1 wherein:

said dead front is covered by a door, said door and said dead front share a common hinge element.

14. The circuit breaker panel of claim 1 wherein:

said panel includes an auxiliary enclosure abutting said enclosure and an extension housing comprising at least two nested tubular elements, said nested tubular elements forming a first and a second raceway, said first raceway is isolated from said second raceway, said first raceway provides access to said enclosure, and said second raceway provides access to said auxiliary enclosure.

* * * * *